(12) United States Patent
Chen et al.

(10) Patent No.: US 8,488,040 B2
(45) Date of Patent: Jul. 16, 2013

(54) MOBILE AND SERVER-SIDE COMPUTATIONAL PHOTOGRAPHY

(75) Inventors: Billy Chen, Bellevue, WA (US); Eyal Ofek, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 346 days.

(21) Appl. No.: 12/818,173

(22) Filed: Jun. 18, 2010

(65) Prior Publication Data

US 2011/0312374 A1 Dec. 22, 2011

(51) Int. Cl.
*H04N 5/222* (2006.01)
*H04N 5/76* (2006.01)

(52) U.S. Cl.
USPC .................................. 348/333.02; 348/231.3

(58) Field of Classification Search
USPC ................ 348/36, 39, 218.1, 333.01–333.05, 348/333.11–333.12
See application file for complete search history.

(56) References Cited

U.S. PATENT DOCUMENTS

| 2005/0231625 A1* | 10/2005 | Parulski et al. | 348/333.12 |
| 2007/0025723 A1* | 2/2007 | Baudisch et al. | 396/287 |
| 2007/0081081 A1* | 4/2007 | Cheng | 348/218.1 |
| 2009/0021576 A1* | 1/2009 | Linder et al. | 348/36 |

FOREIGN PATENT DOCUMENTS

| KR | 1020050045845 A | 5/2005 |
| KR | 1020090009114 A | 1/2009 |
| KR | 100943635 B1 | 2/2010 |

OTHER PUBLICATIONS

"International Search Report", Mailed Date: Dec. 27, 2011, Application No. PCT/US2011/039197, Filed Date: Jun. 4, 2011, pp. 8.

* cited by examiner

*Primary Examiner* — Kelly L Jerabek
(74) *Attorney, Agent, or Firm* — Tracy S Powell; Powell IP Law, PLLC

(57) ABSTRACT

Automated photographic capture assistance and analysis is effectuated to assist users in capturing sufficient and optimal images of a desired image scene for use in a photographic end product. Photographic capture assistance is implemented on the device that includes a user's camera. Photographic capture assistance can include audio and/or graphic information generated in real time locally on the device that includes the user's camera and informs the user where additional images of the image scene ought to be captured and/or whether or not sufficient captured images currently exist for the image scene.

18 Claims, 15 Drawing Sheets

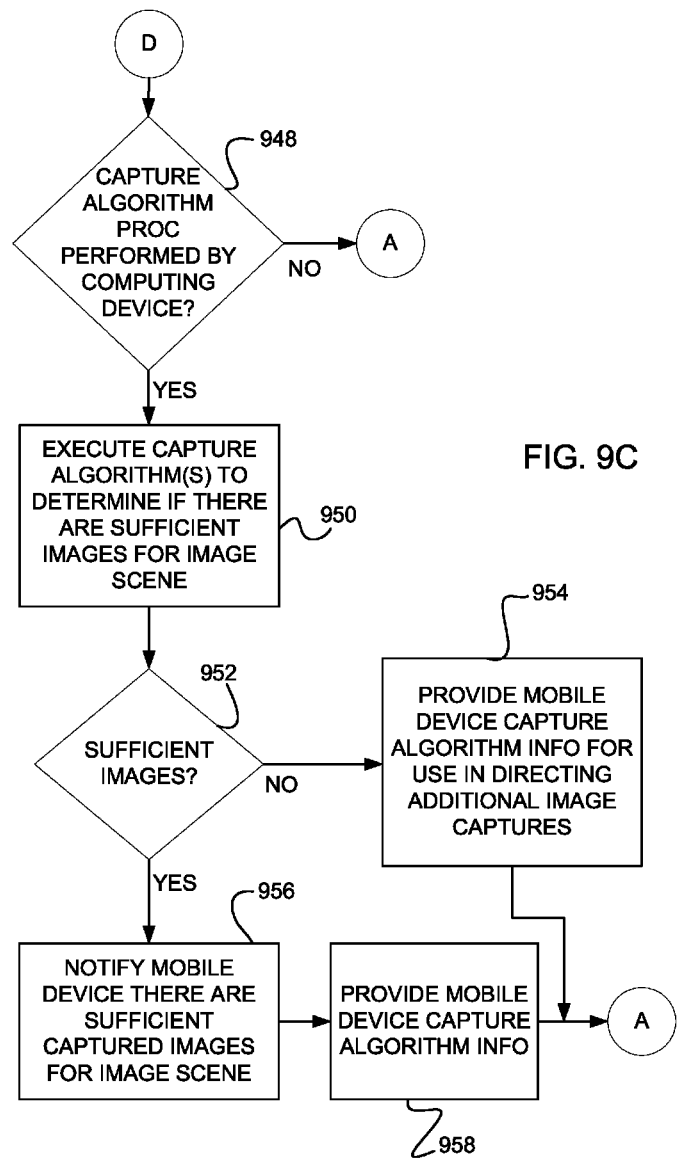

MOBILE AND SERVER-SIDE COMPUTATIONAL PHOTOGRAPHY

BACKGROUND

Mobile devices, e.g., cell phones, today have increasingly sophisticated and enhanced cameras that support users capturing quality photographic images and video, collectively referred to herein as images. Moreover, mobile devices today further have increasingly abundant, high-performance computation power, i.e., are computer devices in their own right with significant computational power that can be channeled into a myriad of applications.

Photosynth is an example of a technology that can benefit from the technological advances in mobile devices. Photosynth enables users to create a three-dimensional, 3-D, browsing experience, i.e., a photosynth, with their photographs. To create a photosynth a user begins by capturing a set of images, or photographs, that have to overlap, cover the scene that is to be generated in 3-D, and contain sufficient textural detail to allow a rich photosynth to be generated. Because of the quality of the cameras in mobile devices today users can utilize their mobile devices to capture images for a photosynth.

Once captured, the images for a photosynth are downloaded to a computer, or computer device, to be processed. The processing, or synthing, of the images can take many hours, depending on the quality and resolution of the images, the detail of the subject matter of the photosynth and the power of the computing device processor. After synthing, the images and associated metadata are uploaded to a photosynth server. At this time a user can finally browse and experience their images in 3-D, or alternatively, discover that they failed to capture a sufficient number of and/or acceptable quality images of the subject matter to render a 3-D, or quality 3-D, image thereof.

Because a user cannot predict the quality of a resultant photosynth frustration can occur in both the generation of a photosynth and the discovery that the generation failed to accomplish the intended goal. For example, a user, to attempt to ensure that they capture all the necessary images for proper coverage and overlap of the subject matter, can take many more redundant pictures of the same image than ultimately is necessary. This redundant capture exercise can greatly increase the time it takes a user to capture photos. Excessive redundant photo capture can also utilize significant storage space that can impede the entire process and/or cause its own problems, e.g., too many images of the same shot can result in no storage available for images of other necessary shots of the subject matter. Finally, excessive redundant photo capture can generate user boredom which detracts from the exercise and the user's ultimate pleasure and desire to create image-based projects, such as photosynths, resulting in none but the most avid enthusiasts doing so.

Moreover, because a user cannot predict the quality of a resultant image-based project, such as a photosynth, and the actual project generation, e.g., synthesizing, also referred to herein as synthing, can be time consuming, user frustration can result when the project generation thereafter fails, e.g., the resultant 3-D image is of a poor quality or could not be generated at all because of missing and/or poor quality images. In this case the user may have to try to return to the scene of the subject matter and attempt to capture missing images, imposing additional user time and effort. And, in some instances, the user may not have the ability to capture desired additional images, e.g., the subject matter scene is no longer logistically accessible to the user, eventuating wasted user effort and additional user dissatisfaction.

Thus, it is desirable to utilize the computational and communicative power of a user's mobile device to assist a user to capture desired, quality images of a subject matter for a photosynth or other image-based projects.

SUMMARY

This summary is provided to introduce a selection of concepts in a simplified form which are further described below in the Detailed Description. This summary is not intended to identify key or essential features of the claimed subject matter, nor is it intended to be used as an aid in determining the scope of the claimed subject matter.

Embodiments discussed herein include systems and methodology for enabling a real time automatic determination of the sufficiency of existing captured images for an image scene that are to be used to generate a photographic end product.

Embodiments discussed herein include systems and methodology for enabling a real time automatic identification of regions of an image scene where it is determined that additional images ought to be captured in order to be able to produce a complete photographic end product.

In embodiments meta data is mined from identified existing captured images of a desired image scene. In embodiments the meta data is used in the execution of one or more capture algorithms that results in the generation of information that can include the sufficiency of the captured images for generating a photographic end product and/or an identification of one or more regions of a desired image scene or portion of a desired image scene that one or more images are recommended to be captured for. In embodiments generated information is used to provide information to a user on the location of the regions that one or more images are recommended to be captured for.

In embodiments meta data is mined locally on a user's mobile device that includes a camera for capturing images. In embodiments the execution of capture algorithms is also performed locally on the user's mobile device.

BRIEF DESCRIPTION OF THE DRAWINGS

These and other features will now be described with reference to the drawings of certain embodiments and examples which are intended to illustrate and not to limit, and in which:

FIGS. 9A-9C illustrate an embodiment logic flow for an embodiment computing device communicating with a user mobile device for the capture of desired images.

DETAILED DESCRIPTION

In the following description, for purposes of explanation, numerous specific details are set forth in order to provide a thorough understanding of embodiments described herein. It will be apparent however to one skilled in the art that the embodiments may be practiced without these specific details. In other instances well-known structures and devices are either simply referenced or shown in block diagram form in order to avoid unnecessary obscuration. Any and all titles used throughout are for ease of explanation only and are not for any limiting use.

Figure 1:
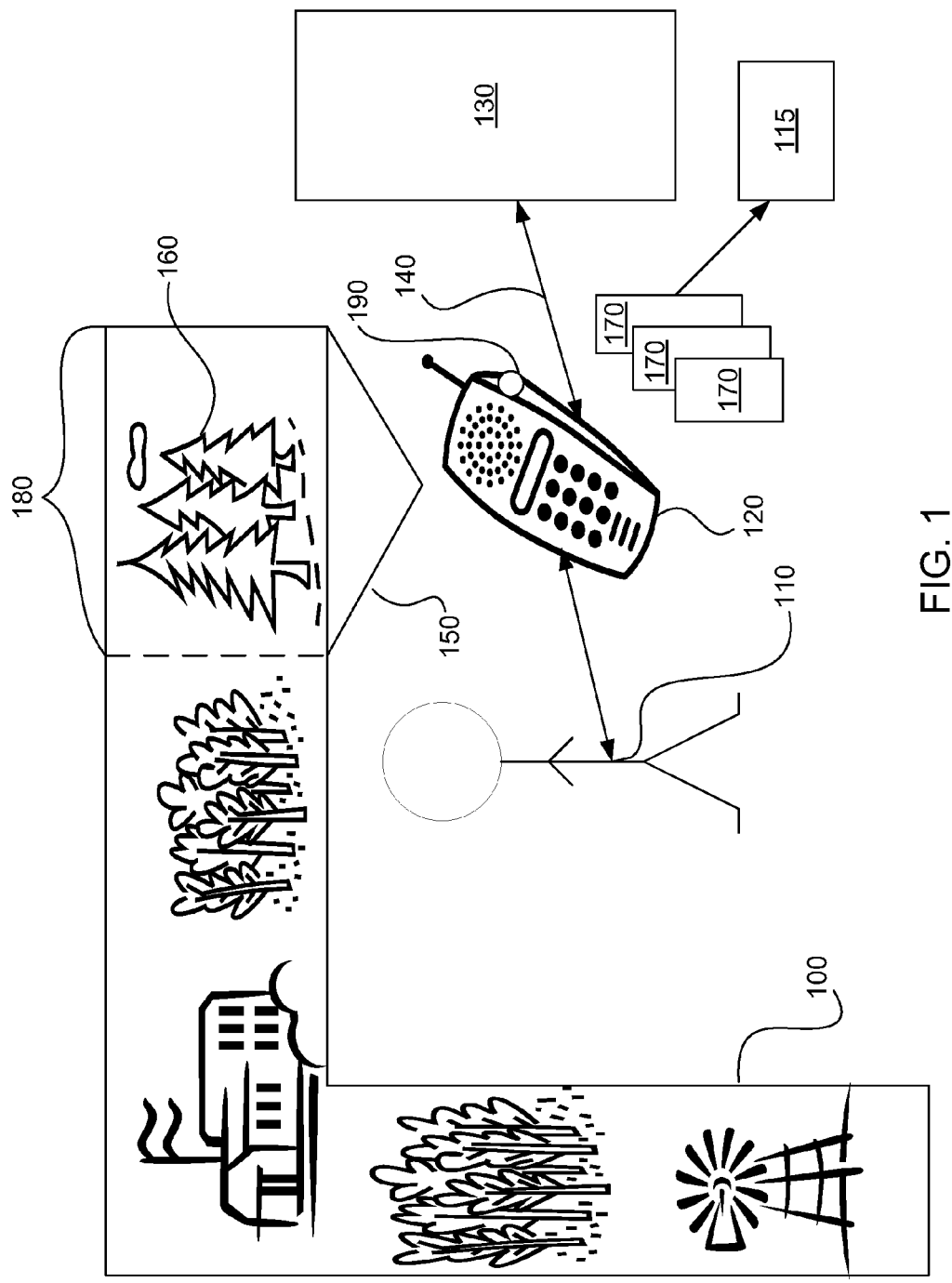
FIG. 1 depicts an embodiment photo image scenario.

FIG. 1 depicts an embodiment photo image scenario. In an embodiment a user 110 wants to take photographs or video, also referred to herein as photos or, collectively, images, of the exemplary image scene 100 before them. In an embodiment the user 110 wants to take the images to use for a photosynth; i.e., a three-dimensional, 3-D, browsing experience of the subject image scene. In other embodiments the user 110 wants to take the images for other purposes, e.g., to generate a panoramic stitch, i.e., a seamless collection of related images stitched together to generate a panoramic view of a subject image scene 100, to generate an appearance capture image, i.e., an image created from one or more related images that depicts, or otherwise highlights, a subject matter's appearance, e.g., the shiny surface of an apple, the wet texture of a soaked rag, etc., etc.

In an embodiment a user 110 utilizes a camera 190 of a mobile device 120, e.g., a cell phone, a smart phone, etc., to capture images 170 of the image scene 100. In an embodiment the mobile device 120 has the capability to communicate 140 wirelessly with a computing device 130. In an embodiment a computing device 130 is a computer or any device capable of executing software instructions, e.g., a server, a cloud, the user's computer, etc.

In embodiments the mobile device 120 communicates 140 with the computing device 130 for one or more of a variety of reasons, including, but not limited to, to transmit captured images 170 to the computing device 130 for storage and/or processing, to receive feedback on one or more captured images 170, to obtain previously captured images of the same image scene 100 or one or more segments 180, i.e., portions, of the image scene 100, to receive information on a collection of captured images 170 of the image scene 100 for generating a photographic end product 115, e.g., a photosynth, a panoramic stitch, etc., to receive information on the aspects, or segments 180, of the image scene 100 that still require captured images 170 to help ensure a quality photographic end product 115, etc., etc.

In another embodiment a user 110 utilizes a camera with the capability to communicate with the user 110 and wirelessly to a computing device 130 to capture images 170 of an image scene 100.

In an embodiment, at any one time the mobile device 120 has an image view 150 of the desired image scene 100, or a segment 180 of the desired image scene 100. In the exemplary image scene 100 of FIG. 1 the mobile device 120 is depicted as having a current image view 150 of a set of trees 160 that encompass a segment 180 of the entire exemplary image scene 100.

In an embodiment a mobile device photo capture application, also referred to herein as a md photo cap app, executing on the mobile device 120 assists the user 110 in capturing requisite images 170 of a desired image scene 100 for an image-based project, also referred to herein as a photographic end product, 115, e.g., for use in generating a photosynth, photo stitch, etc. Embodiment components of an embodiment md photo cap app 200 are illustrated in FIG. 2.

Figure 2:
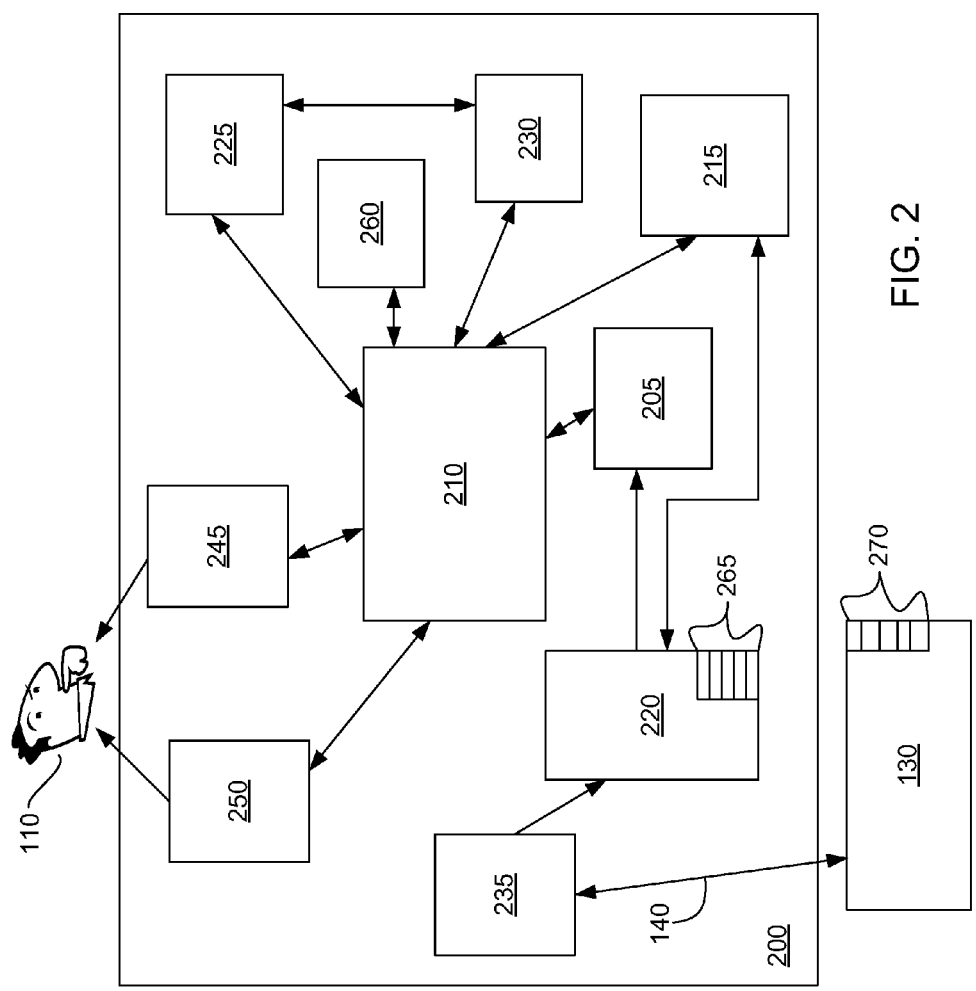
FIG. 2 depicts an embodiment mobile device photo capture application, also referred to herein as a md photo cap app.

Referring to FIG. 2, an embodiment md photo cap app 200 has an image processing manager 210 which has the capability to manage, or direct, the capture and processing of images 170 of an image scene 100. In an embodiment the image processing manager 210 also has the capability to retrieve pre-captured images 270 of an image scene 100 to use in conjunction with locally obtained captured images 170 for establishing a set of images 170 for use in an image-based project 115.

In an embodiment the md photo cap app 200 has, has access to, or is otherwise associated with, collectively referred to herein as has, a local photo database 220 of stored images 265. In an embodiment the stored images 265 are images 170 that have been locally taken by the camera 190 of the mobile device 120 of an image scene 100. In an embodiment the stored images 265 are all the images 170 locally taken by the camera 190 of the mobile device 120 and stored thereon, which can include images 170 of a desired image scene 100 and images of other image scenes. In an embodiment the stored images 265 can include images 270 retrieved from a computing device 130, e.g., images 270 stored in a global database on or accessible to a server or a cloud that depict one or more aspects 180 of the currently desired image scene 100, images 270 stored on or accessible to the user's computing device that depict one or more aspects 180 of the currently desired image scene 100, etc.

In an embodiment the md photo cap app 200 has a server communications, or com, interface 235 which has the capability to communicate 140 with a computing device 130. In an embodiment the server com interface 235 is used to transmit one or more captured images 170 and/or stored images 265 to the computing device 130 for storage and/or processing. In an embodiment the server com interface 235 is used to download one or more images 270 from the computing device 130 to the local photo database 220.

In an aspect of this embodiment the server com interface 235 downloads one or more images 270 that depict a currently desired image scene 100 or one or more aspects 180, e.g., image view 150, of a currently desired image scene 100. In an aspect of this embodiment the md photo cap app 200 uses downloaded images 270 to identify whether there are additional images 170 of a current image scene 100 that should be captured. In an aspect of this embodiment the md photo cap app 200 uses downloaded images 270 to determine, if additional images 170 should be taken, what additional images 170 should be captured, i.e., which image views 150, or image scene aspects 180, are yet to be captured.

In an embodiment the server com interface 235 communicates 140 with the computing device 130 to provide the computing device 130 meta data for one or more stored images 265 and/or information derived from an analysis of one or more stored images 265.

In an embodiment the server com interface 235 receives information from the computing device 130 resulting from an analysis of one or more images 170 of an image scene 100 that is used by the md photo cap app 200 to automatically capture one or more additional images 170 of the image scene 100 and/or to instruct a user 110 to capture one or more additional images 170.

In an embodiment the md photo cap app 200 has a camera sensor controller 225 that has the capability to keep track of and control one or more orientation sensors for the camera 190 of the mobile device 120. In an embodiment an orientation sensor for a mobile device camera 190 is a compass which provides the direction that the camera lens is currently pointing from a global north orientation axis. In an embodiment other orientation sensors for a mobile device camera 190 are one or more gyroscope sensors that keep track of and control the tilt, in the vertical access, and pan, in the horizontal access, of the camera lens. In an embodiment another orientation sensor for a mobile device camera 190 is a GPS, global positioning system, sensor which identifies the locality of the mobile device camera 190. In embodiments a subset of these orientation sensors, additional, and/or other orientation sensors, e.g., a focal length sensor, etc., are included with and used by an embodiment mobile device camera 190.

In an embodiment the camera sensor controller 225 relays information gathered from one or more orientation sensors to the image processing manager 210 for use in guiding a user 110 in capturing a desired image 170. In an embodiment the camera sensor controller 225 relays information gathered from one or more orientation sensors to the image processing manager 210 for use in displaying to the user 110 those aspects 180 of the desired image scene 100 that have, or have not, already been sufficiently captured, e.g., photographed, as further discussed herein with reference to FIG. 6. In an embodiment the camera sensor controller 225 relays information gathered from one or more orientation sensors to the image processing manager 210 for use in audioally informing a user 110 as to what additional image(s) 170 the user 110 should capture for a desired image scene 100.

In an embodiment the camera sensor controller 225 relays information gathered from one or more orientation sensors to the image processing manager 210 for uploading to the computing device 130. In an embodiment the computing device 130 analyzes information gathered from one or more orientation sensors for a particular captured image 170, or images 170, for use in determining whether satisfactory images 170 have been captured for a desired image scene 100, or alternatively, if one or more additional images 170 of the image scene 100 should be captured.

In an embodiment the information gathered from one or more orientation sensors is included as meta data with a corresponding captured image 170.

In an embodiment the camera sensor controller 225 relays information gathered from one or more orientation sensors to the image processing manager 210 for use in analyzing how to modify the camera lens positioning to capture a desired image view 150 for an image scene 100. In an aspect of this embodiment the image processing manager 210 uses information gathered by the camera sensor controller 225 to determine where the camera lens is currently aimed, i.e., a calculated camera lens position, and, consequently the current image view 150, and compares this with information for one or more stored images 265 for the desired image scene 100. In an aspect of this embodiment the image processing manager 210 uses the comparison data to calculate where the camera lens is to be directed to obtain an image view 150 for an image 170 that is desired for an image-based project 115.

In an embodiment the image processing manager 210 provides the user 110, via a user audio interface 250, the calculated camera lens position, or information derived there from, e.g., audio directions, to direct the user 110 to aim their mobile device camera 190 in a predetermined position to obtain a currently desired image view 150 and subsequently capture a desired image 170. In another embodiment the image processing manager 210 provides the user 110, via a visual GUI 245, the calculated camera lens position, or information derived there from, e.g., directions, a map, a drawing of the image scene 100 with a pointer to an aspect thereof, etc., to direct the user 110 to aim their mobile device camera 190 in a predetermined position to obtain a currently desired image view 150 and subsequently capture a desired image 170.

In an alternative embodiment the image processing manager 210 uses the calculated camera lens position to direct the camera sensor controller 225 to automatically reposition the camera lens. In an aspect of this alternative embodiment the image processing manager 210 thereafter commands a camera controller 260 which has the capability to automatically capture an image 170 of a current image view 150. In an aspect of this alternative embodiment the and photo cap app 200 stores the automatically captured image 170 in the local photo database 220.

As noted, in an embodiment the camera sensor controller 225 relays information gathered from one or more orientation sensors to the image processing manager 210, which the image processing manager 210 continuously reviews and compares to information on the stored images 265 for a desired image scene 100. In a second alternative embodiment when the image processing manager 210 identifies a camera lens position that entails an image view 150 that is to be captured the image processing manager 210 directs the camera controller 260 to automatically capture the image 170.

In a third alternative embodiment when the image processing manager 210 identifies a camera lens position that encompasses an image view 150 that is to be captured the image processing manager 210 notifies the user 110 to capture the image 170, e.g., take a photo 170.

In an aspect of this third alternative embodiment the image processing manager 210 commands the user audio interface 250 to notify the user 110 to capture an image 170, or images 170, at a particular camera lens position. For example the user audio interface 250 can issue an audio signal to the user 110, such as a beep, when the user 110 has the mobile device camera lens directed to the correct position for a desired image view 150. As a second example the user audio interface 250 can alter an audio signal output as a user 110 moves their mobile device camera lens to point to the desired image view 150, e.g., output intermittent beeps when the camera lens is not in an image view position that gradually changes to one continuous beep when the camera lens is positioned at a desired image view 150. As a third example the user audio interface 250 can increase the tone and/or loudness of an audio signal as a user 110 positions the mobile camera lens closer to, and finally at, a desired image view 150.

In an alternative aspect of this third alternative embodiment the image processing manager 210 commands the visual GUI 245 to generate and output a display to a user 110 to notify the user 110 to capture an image 170, or images 170, at one or more camera lens positions. For example the visual GUI 245 can display the current image view 150 with a color overlay that changes from clear, when the camera lens is not in position, to black when the user 110 points the camera lens at a desired image view 150 for image 170 capture. As a second example the visual GUI 245 can display the desired image scene 100, or an aspect 180 thereof, with a first pointer indicating where the camera lens is currently directed and a second pointer indicating a desired image view 150 and the visual GUI 245 redirects the first pointer as the user 110 alters the camera lens position until the first pointer and second pointer are overlaid, indicting the camera lens is in the correct position for the desired image view 150.

In an embodiment the and photo cap app 200 has an image quality controller 230 that has the capability to command the camera sensor controller 225 to change the position of the camera lens to adjust for quality control of a captured image 170. For example, the image quality controller 230 may command the camera sensor controller 225 to tilt the camera lens down one or more degrees to adjust for glare that would otherwise result in an overexposed captured image 170.

In an embodiment the image quality controller 230 has the capability to modify a captured image 170 to adjust for quality control, e.g., to adjust the hue, color, saturation, lighting, etc., of a captured image 170 to enhance the captured image 170 and render it useable for a photographic end product 115. In an embodiment the image quality controller 230 stores a modified captured image 170 as a stored image 265 in the local photo database 220.

In an embodiment the md photo cap app 200 has a photo database organizer 205 that organizes, analyzes and keeps track of the stored images 265 in the local photo database 260. In an embodiment the photo database organizer 205 organizes the stored images 265 so that the stored images 265, both captured 170 and downloaded 270, of the same image scene 100 are grouped or otherwise organized together. In an embodiment the photo database organizer 205 analyzes the stored images 265 and mines, or otherwise collects, meta data there from. In an embodiment the photo database organizer 205 stores mined meta data from the stored images 265. In an embodiment the meta data from stored images 265 is used by the md photo cap app 200 to assist in determining the aspects 180 of an image scene 100 for which there are corresponding stored images 265.

In an embodiment the photo database organizer 205 communicates with the image processing manager 210 to provide the image processing manager 210 information on existing stored images 265 for a desired image scene 100, e.g., identification of the content of the stored images 265, including features thereof, subject matter of the stored images 265, date a stored image 265 was captured, time of day a stored image 265 was captured, identify of any individuals depicted in a stored image 265, the identity of the user 110 that captured the stored image 265, etc.

In an embodiment the md photo cap app 200 has a photo synthesizer 215 which has the capability to analyze one or more stored images 265 for an image scene 100 and generate an analysis of whether or not there are adequate images of the desired image scene 100 to render a photographic end product 115, e.g., a photosynthesis, photo stitch, etc. In an embodiment the photo synthesizer 215 can determine in real time that there are sufficient stored images 265 for a desired image scene 100 or one or more aspects 180 of a desired image scene 100, or, alternatively, that one or more additional images 170 for the image scene 100 should be captured.

In an embodiment the photo synthesizer 215's analysis is utilized by the md photo cap app 200 to notify a user 110 in real time, while the user 110 is still at a desired image scene 100, that the user 110 should capture one or more additional images 170. In an embodiment the photo synthesizer 215's analysis is utilized by the md photo cap app 200 to direct, or otherwise instruct, a user 110 as to what additional image(s) 170 of a desired image scene 100 the user 110 ought to capture.

In an embodiment the photo synthesizer 215 utilizes one or more comparison algorithms to render an analysis on the completeness of a set, or subset, of stored images 265 for an image scene 100. In an embodiment the comparison algorithm(s) executed by a photo synthesizer 215 is determined by one or more factors, including, but not limited to, the computing power of the microprocessor executing the md photo cap app 200, time constraints imposed on the md photo cap app 200 to render an image, or photo, set analysis determination, the desired accuracy of a rendered image set analysis determination, etc.

Figure 3:
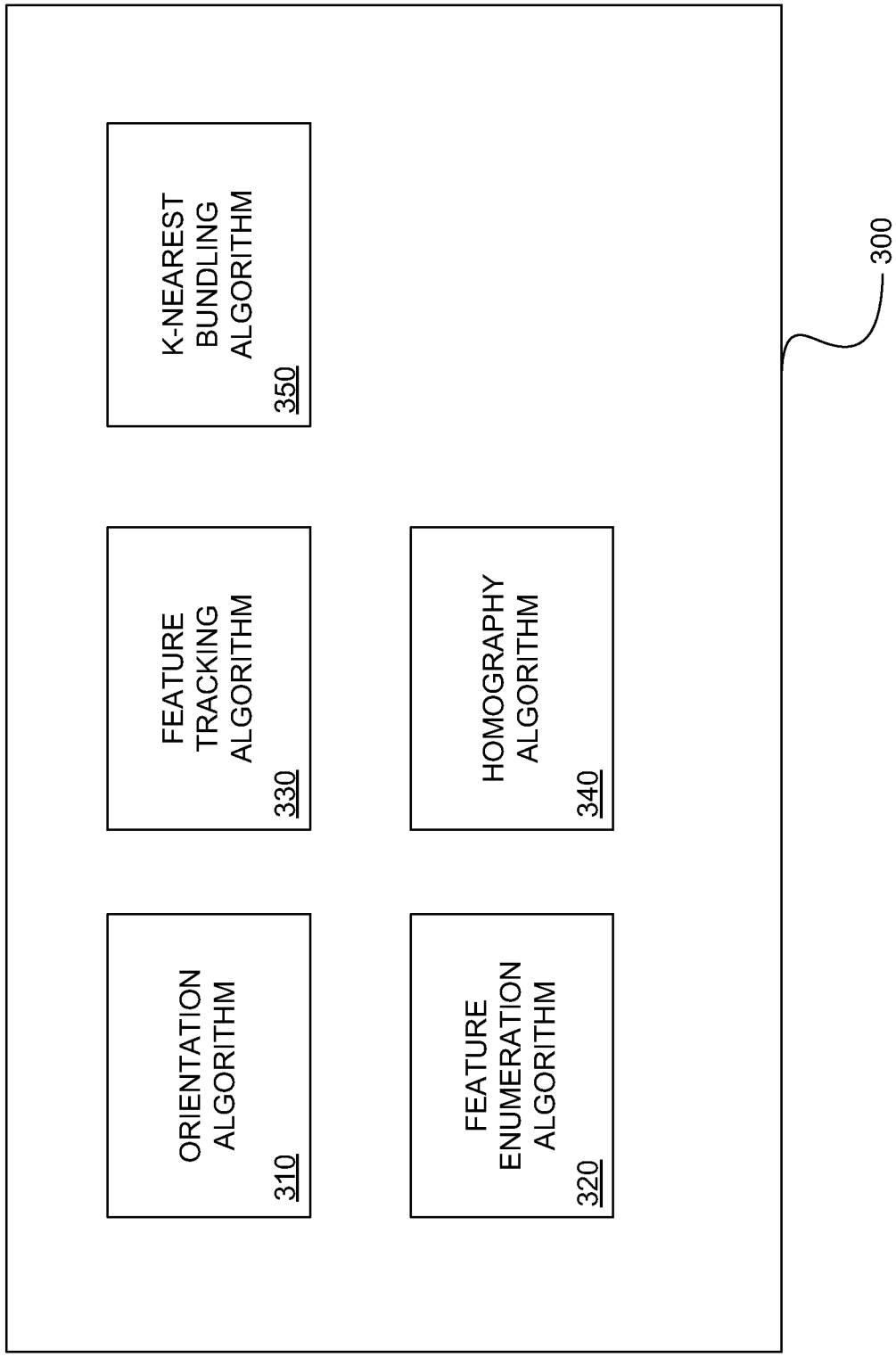
FIG. 3 depicts embodiment comparison algorithms that can be employed to determine the sufficiency of a set of captured images.

FIG. 3 depicts an embodiment set of comparison algorithms 300 for use by an embodiment photo synthesizer 215 to render an image set analysis determination that either indicates there are adequate stored images 265 for an image scene 100 or an aspect 180 of the image scene 100, or alternatively, one or more additional images 170 should be captured. In other embodiments more, less, or different comparison algorithms 300 can be used by an embodiment photo synthesizer 215 to render an image set analysis determination.

Figure 4A:
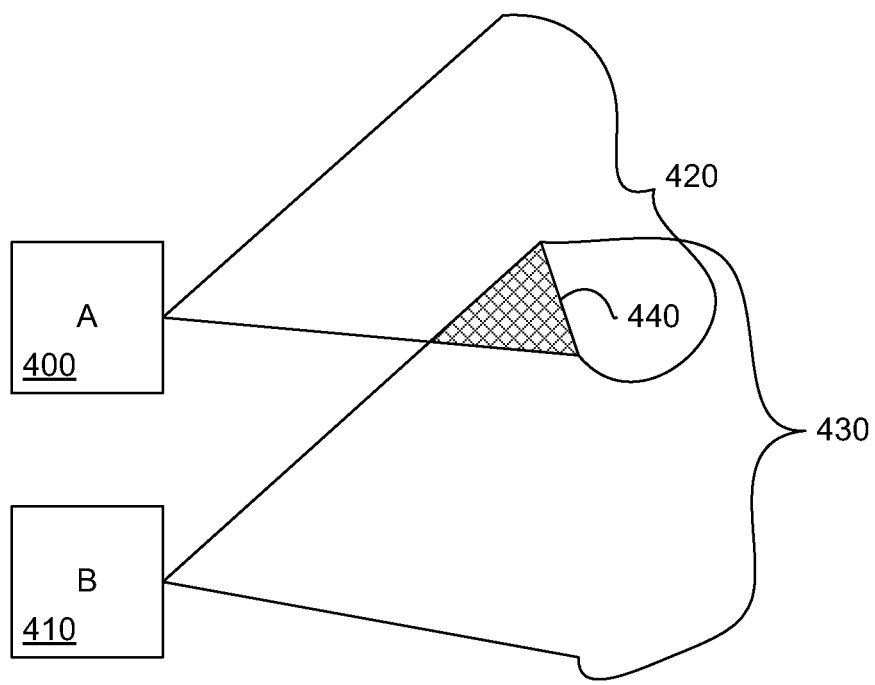
FIGS. 4A and 4B depict exemplary image comparison results generated by an embodiment orientation algorithm.

Referring to FIG. 3, a first embodiment comparison algorithm 300 is an orientation algorithm 310. In an embodiment an orientation algorithm 310 uses information from the mobile device's position orientation sensors to identify, from at least one perspective, the image view 150 for a captured image 170. In an embodiment position orientation sensor information, e.g., GPS, compass, tilt, pan, etc., is stored as meta data included with the data of each stored image 265. In an embodiment the photo synthesizer 215 executes an embodiment orientation algorithm 310 to compare the position orientation sensor information for two or more stored images 265 of a desired image scene 100. In an embodiment the comparison results in a calculated field of view 150 generated for one stored image 265 is then overlaid, or otherwise juxtaposed, with the calculated and generated field of view 150 of at least one other stored image 265. In an embodiment the resultant field of view overlap, or lack thereof, is determinative of whether there are sufficient stored images 265 of the image scene 100, or an aspect 180 of the image scene 100, For example, and referring to FIG. 4A, assume that there are two stored images, A 400 and B 410, for a desired image scene 100. In an embodiment, when both stored image A 400 and stored image B 410 were captured meta data informing each image's field of view, e.g., GPS, compass, focal length, pan, tilt, etc., was identified and stored. In an embodiment an image's field of view, or image view 150, describes with respect to the camera lens' position orientation where the camera was taking a picture at the time the corresponding image 170 was captured. In a first instance of this example, image A's field of view 420 only slightly overlaps 440 image B's field of view 430. In an embodiment in this first example instance the orientation algorithm 310 determines that there is insufficient overlap 440 between image A 400 and image B 410, and thus, one or more additional images 170 should be captured between the image view 420 of image A 400 and the image view 430 of image B 440.

Figure 4B:
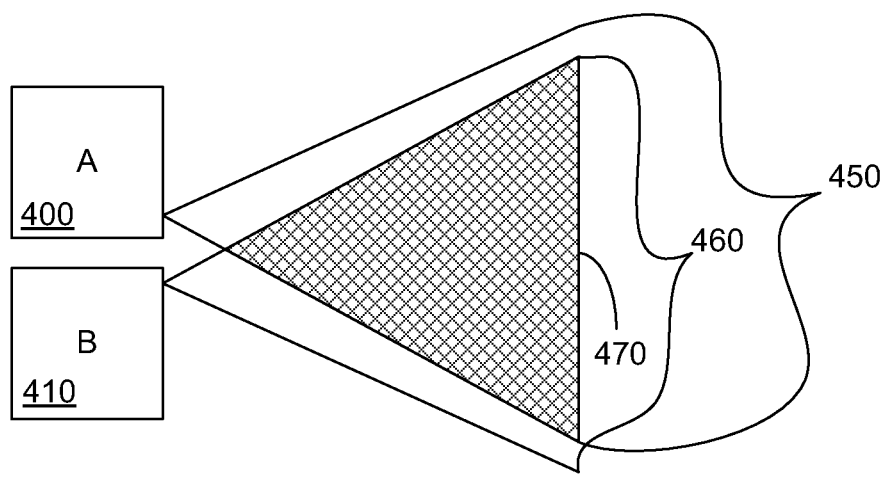

Referring to FIG. 4B, in a second instance of this example, image A's field of view 450 now overlaps 470 much more significantly with image B's field of view 460. In an embodiment in this second example instance the orientation algorithm 310 determines that there is sufficient overlap 470 between image A 400 and image B 410, and thus, there is no need to capture any additional images 170 between the image view 450 of image A 400 and the image view 460 of image B 410.

In an embodiment orientation algorithm 310 the last captured image 170 is compared to a previously captured stored image(s) 265. In an aspect of this embodiment a compared previously captured stored image 265 is the image 170 that was captured immediately prior to the last captured image 170. In another aspect of this embodiment a compared previously captured stored image 265 is an image 170 whose position orientation meta data identifies its image view 150 as being in the closest positional proximity to the image view 150 defined by the position orientation meta data of the last captured image 170. In other aspects of this embodiment a compared previously captured stored image 265 is chosen for other characteristics or combinations of characteristics, e.g., the most recently captured image with the closest positional proximity image view 150 to the image view 150 of the last captured image 170, etc.

In an embodiment orientation algorithm 310 a chain of stored images 265 is organized, or otherwise generated, and saved upon the comparison of various combinations of two or more stored images 265. In an embodiment the chain of stored images 265 is a set of positionally contiguous captured images 170 of an image scene 100, i.e., a set of images 170 that depict positionally contiguous aspects 180 of an image scene 100.

In an embodiment a second comparison algorithm 300 is a feature enumeration algorithm 320. In an embodiment a feature enumeration algorithm 320 identifies and compares the number of similar features, i.e., the number of the same type of item(s) or aspect(s) of the same type of item(s), depicted in two or more stored images 265. In an embodiment the resultant quantity of identified similar features is used to determine whether there are sufficient stored images 265 of an image scene 100 or an aspect 180 of the image scene 100 to generate a satisfactory photographic end product 115, or, alternatively, one or more additional images 170 ought to still be captured.

In an embodiment the feature enumeration algorithm 320 extracts, or otherwise identifies, one or more predetermined points of interest, e.g., corners, angles, walls, trees, etc., in a last captured image 170. In an embodiment the feature enumeration algorithm 310 compares the identified points of interest from the last captured image 170 with extracted points of interest in one or more prior captured stored images 265 and renders a determination as to how many points of interest the compared images have in common. In an embodiment if the compared stored images 265 have a threshold number of common points of interest, e.g., three, four, etc., the feature enumeration algorithm 320 determines there are sufficient stored images 265 for an image scene 100 or an aspect 180 of the image scene 100. In an embodiment if the compared stored images 265 have less than a threshold number of common points of interest the feature enumeration algorithm 320 determines there is one or more images 170 still to be captured.

In an embodiment the feature enumeration algorithm 320 operates with the premise that if there are sufficient points of interest shared between two or more stored images 265 of an image scene 100 or aspect 180 of the image scene 100 then the feature enumeration algorithm 320 can calculate where a compared stored image 265 coincides, or otherwise overlaps, with one or more other compared stored images 265.

In an embodiment feature enumeration algorithm 320 the last captured image 170 is compared to a previously captured stored image(s) 265. In an aspect of this embodiment a compared previously captured stored image 265 is the image 170 that was captured immediately prior to the last captured image 170. In another aspect of this embodiment a compared previously captured stored image 265 is an image 170 whose position orientation meta data identifies its image view 150 as being in the closest positional proximity to the image view 150 defined by the position orientation meta data of the last captured image 170. In other aspects of this embodiment a compared previously captured stored image 265 is chosen for other characteristics or combinations of characteristics, e.g., the most recently captured image with the closest positional proximity image view 150 to the image view 150 of the last captured image 170, etc.

In an embodiment the feature enumeration algorithm 320 is cognizant of the points of interest it is identifying in the stored images 265. In this aspect of an embodiment the feature enumeration algorithm 320 is unconcerned with determining that the points of interest between compared stored images 265, e.g., the corners identified in each of two compared stored images 265, are the exact same points of interest. In other words, and for example, in an aspect of this embodiment the feature enumeration algorithm 320 identifies the number of corners in two or more compared images, e.g., images A and B, and determines that image A has four corners and image B has three corners, but the feature enumeration algorithm 310 does not determine whether any one of the four corners in image A is the same corner as any one of the three corners depicted in image B.

In an embodiment feature enumeration algorithm 320 a chain of stored images 265 is organized, or otherwise generated, and saved upon the comparison of various combinations of two or more stored images 265. In an embodiment the chain of stored images 265 is a set of positionally contiguous captured images 170 of an image scene 100.

In an embodiment a third comparison algorithm 300 is a feature tracking algorithm 330. In an embodiment a feature tracking algorithm 330 tracks one or more features, i.e., points of interest, between two or more stored images 265. In an aspect of this embodiment a feature tracking algorithm 330 tracks one or more features between the last captured image 170 and one or more previously captured stored images 265. In an embodiment the feature tracking algorithm 330 renders a determination as to whether the compared images 265 share sufficient tracked features to indicate that satisfactory detail of an image scene 100 or an aspect 180 of the image scene 100 has been captured or, alternatively, one or more images 170 ought to still be captured.

In an embodiment feature tracking algorithm 330 the last captured image 170 is compared to one or more previously captured stored images 265. In an aspect of this embodiment a compared previously captured stored image 265 is the image 170 that was captured immediately prior to the last captured image 170. In another aspect of this embodiment a compared previously captured stored image 265 is an image whose position orientation meta data identifies its image view 150 as being in the closest positional proximity to the image view 150 defined by the position orientation meta data of the last captured image 170. In other aspects of this embodiment a compared previously captured stored image 265 is chosen for other characteristics or combinations of characteristics, e.g., the most recently captured image with the closest positional proximity image view 150 to the image view 150 of the last captured image 170, etc.

In an embodiment the feature tracking algorithm 330 is cognizant of the specific points of interest it is identifying in the various stored images 265, e.g., the feature tracking algorithm 330 is cognizant that two of the three corners identified in each of two compared stored images 265 are the exact same corners of the exact same building. In other words, and for example, in an embodiment the feature tracking algorithm 330 identifies the number of corners of a building in two images, A and B, and determines that image A has three of four corners that depict the same three corners of the same building, out of five corners, depicted in image B.

In an embodiment if the stored images 265 compared with the feature tracking algorithm 330 have a threshold number of common features, e.g., three, four, etc., the feature tracking algorithm 330 determines there are sufficient stored images 265 for an image scene or an aspect 180 of the image scene 100. In an embodiment if the compared stored images 265 have less than a threshold number of shared features the feature tracking algorithm 330 determines there is one or more images 170 still to be captured.

In an embodiment the feature tracking algorithm 330 operates with the premise that if there are sufficient shared features depicted in two or more stored images 265 of an image scene 100 or aspect 180 of the image scene 100 then the feature tracking algorithm 330 can calculate where a stored image 265 coincides, or otherwise overlaps, with one or more other compared stored images 265.

In an embodiment feature tracking algorithm 330 a chain of stored images 265 is organized and saved upon the comparison of various combinations of two or more stored images 265. In an embodiment the chain of stored images 265 is a set of positionally contiguous captured images 170 of an image scene 100.

In an embodiment a fourth comparison algorithm 300 is a homography algorithm 340. In an embodiment the homography algorithm 340 uses projective geometry to generate an invertible transformation from a real projective plane of an image view 150 to a projective plane that maps straight lines to straight lines between two compared stored images 265. In an embodiment the homography algorithm 340 maps identified common features in two stored images 265 in a three-dimensional, 3-D, planar view to extract shared commonality. In an embodiment the extracted shared commonality is analyzed to render a determination as to whether the compared stored images 265 share a sufficient amount an image scene 100 or an aspect 180 of the image scene 100 for generating an adequate photographic end product 115, or, alternatively, one or more additional images 170 ought to be captured.

In an embodiment two stored images 265 with a shared image view 150, or a shared portion of an image view 150, in the same planar surface in space are related by a homography that is utilized to determine the sufficiency of the collective detail within the compared stored images 265 for generating a resultant photographic end product 115.

Figure 5A:
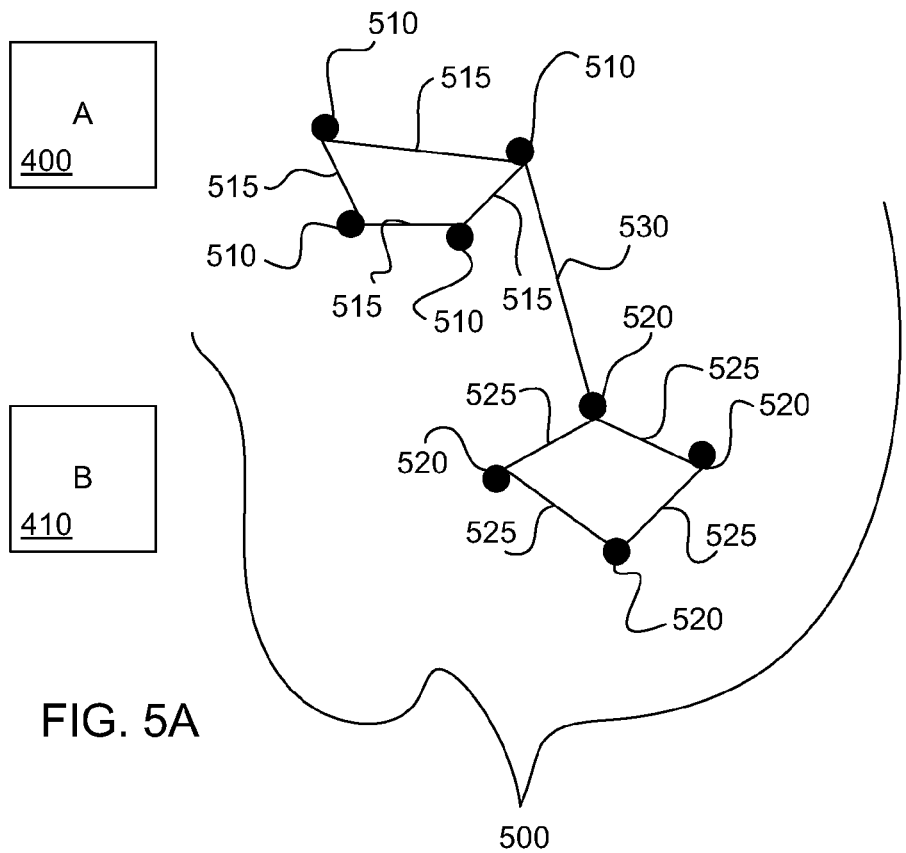
FIGS. 5A and 5B depict exemplary image comparison results generated by an embodiment homography algorithm.

For example, and referring to FIG. 5A, assume that there are two stored images, image A 400 and image B 410, that have some degree of commonality of their image views 150 for an image scene 100. In an embodiment the homography algorithm 340 analyzes image A 400 and image B 410 and generates a three-dimensional mapping, or homography, 500 of the features 510 depicted in image A 400 and the features 520 portrayed in image B 410. In the example of FIG. 5A one or more features 510 depicted in image A 400 are connected 515 in a two-dimensional plane and one or more features 520 pictured in image B 410 are also connected 525 in a two-dimensional plane, which results in a picturization of each image's feature relationships. In the exemplary homography 500 the same feature(s) that are portrayed in image A 400 and in image B 410 are connected 530 in a third dimensional plane imposed on the two-dimensional plane characterizing the feature relationships for image A 400 and image B 410 respectively. In the example of FIG. 5A there is insufficient feature capture overlap between the image view 150 of image A 400 and the image view 150 of image B 410 as denoted by the minimal connections 530 between the features 510 depicted in image A 400 and the features 520

Figure 5B:
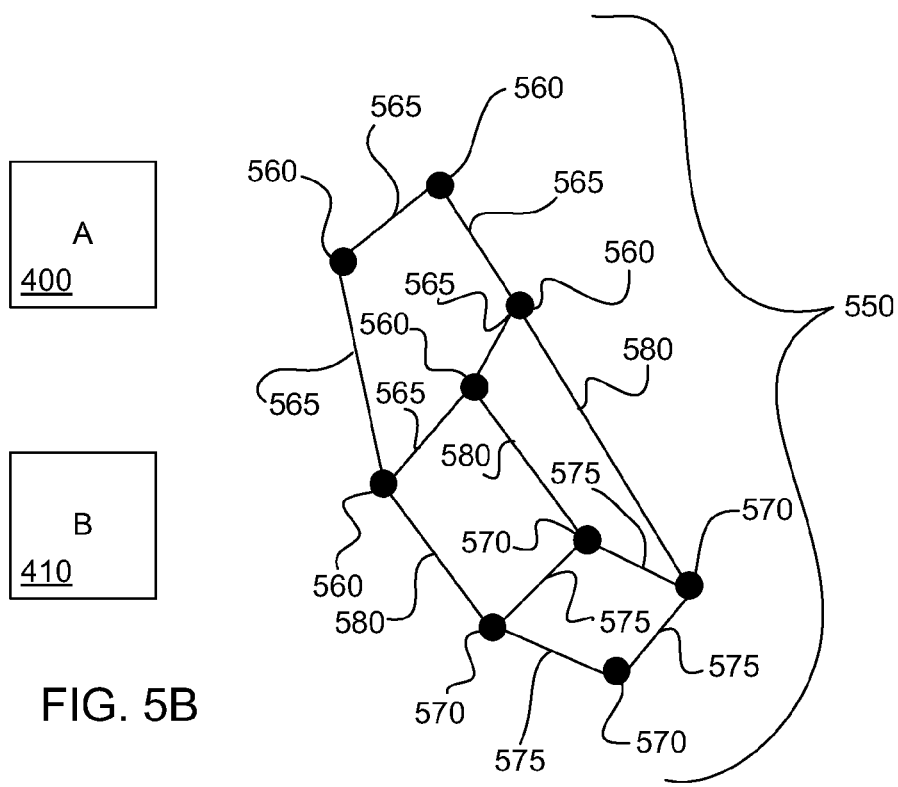

In the example of FIG. 5B one or more features 560 depicted in image A 400 are connected 565 in the exemplary homography 550 in a two-dimensional plane and one or more features 570 pictured in image B 410 are also connected 575 in a two-dimensional plane. In the exemplary homography 550 the same feature(s) that are portrayed in image A 400 and in image B 410 are connected 580 in a third dimensional plane imposed on the two-dimensional plane characterizing the feature relationships for image A 400 and image B 410 respectively. In contrast to the example of FIG. 5A, in the example of FIG. 5B there is considerably more connections 580 in the homography 550 for image A 400 and image B 410 indicating significantly more feature capture overlap between image A 400 and image B 410. In the example of FIG. 5B an embodiment homography algorithm 340 renders a determination that sufficient images 170 have been captured for the image scene 100 or an aspect 180 of the image scene 100.

In an embodiment homography algorithm 340 the last captured image 170 is compared to a previously captured stored image 265. In an aspect of this embodiment the compared previously captured stored image 265 is the image 170 that was captured immediately prior to the last captured image 170. In another aspect of this embodiment the compared previously captured stored image 265 is an image whose position orientation meta data identifies its image view 150 as being in the closest positional proximity to the image view 150 defined by the position orientation meta data of the last captured image 170. In other aspects of this embodiment the compared previously captured stored image 265 is chosen for other characteristics or combinations of characteristics, e.g., the most recently captured image with the closest positional proximity image view 150 to the image view 150 of the last captured image 170, etc.

In an embodiment homography algorithm 340 a chain of positionally contiguous stored images 265 is organized and saved upon the comparison of various combinations of two or more stored images 265.

In an embodiment a fifth comparison algorithm 300 is a k-nearest bundling algorithm 350. In an embodiment the k-nearest bundling algorithm 350 bundles, or synthesizes, a subset, e.g., two, three, etc., of stored images 265 which is then used to render a determination as to whether the compared stored images 265 collectively display a sufficient amount of a desired image scene 100 or an aspect 180 of the desired image scene 100, or, alternatively, one or more additional images 170 ought to be captured.

In an embodiment the process of bundling, or synthesizing, involves identifying specific features, e.g., the corner of a window frame, a door handle, etc., in the set of stored images 265 to be bundled. In an embodiment the k-nearest bundling algorithm 350 compares the identified features in one stored image 265 and matches features with identified features in the one or more other stored images 265 in the set to be bundled to identify identical areas, or aspects 180, of an image scene 100 captured in each of the compared stored images 265. In an embodiment the k-nearest bundling algorithm 350 compares identified differences in the relationships between matched features, e.g., angle, distance, etc., and identifies the three-dimensional position of each matched feature, as well as the position and angle at which each stored image 265 was captured. In an embodiment the k-nearest bundling algorithm 350 utilizes the generated information gleaned from the bundled stored images 265 to render a determination as to whether sufficient detail of an image scene 100 or an aspect 180 of the image scene 100 has been captured, or alternatively, one or more additional images 170 should be taken.

In an embodiment k-nearest bundling algorithm 350 the last captured image 170 is compared to one or more previously captured stored images 265. In an aspect of this embodiment a compared previously captured stored image 265 is the image 170 that was captured immediately prior to the last captured image 170. In another aspect of this embodiment a compared previously captured stored image 265 is an image whose position orientation meta data identifies its image view 150 as being in the closest positional proximity to the image view 150 defined by the position orientation meta data of the last captured image 170. In other aspects of this embodiment a compared previously captured stored image 265 is chosen for other characteristics or combinations of characteristics, e.g., the most recently captured image with the closest positional proximity image view 150 to the image view 150 of the last captured image 170, etc.

In an embodiment the images 170 that are compared using any of the embodiment comparison algorithms 300 are stored images 265 that were captured locally by the camera 190 of the mobile device 120 upon which the embodiment and photo cap app 200 executes. In an embodiment the images 170 that are compared using any of the embodiment comparison algorithms 300 are stored images 265 that were captured locally and/or images 270 retrieved from a computing device 130 that were captured by a current user 110 or some other user 110.

In other embodiments there can be fewer, additional and/or different comparison algorithms 300 employed to determine the sufficiency of a set of captured images 170, e.g., a bundling algorithm that bundles all the known images 170 of an image scene 100, etc.

In an embodiment the md photo cap app 200 executes one or more comparison algorithms 300 that results in a determination as to whether there are sufficient stored images 265 for an image scene 100 or an aspect 180 of the image scene 100, or alternatively, whether one or more additional images 170 should be captured. In an alternative embodiment the md photo cap app 200 uploads the images 170 captured locally on the mobile device 120 to a computing device 130 which executes one or more comparison algorithms 300 and downloads the results thereof and/or information derived there from to the mobile device 120 for use in automatically capturing or, alternatively, directing a user 110 to capture one or more additional images 170.

As previously noted, in an embodiment the md photo cap app 200 has the capability to inform, or instruct, a user 110 on the aspects 180 of an image scene 100 that currently lack sufficient captured images 170. In an embodiment an augmented reality visualization is generated and output to a user 110 via the visual GUI 245. An exemplary augmented reality visualization 600 for the image view 150 of the image scene 100 of FIG. 1 is displayed in FIG. 6.

Figure 6:
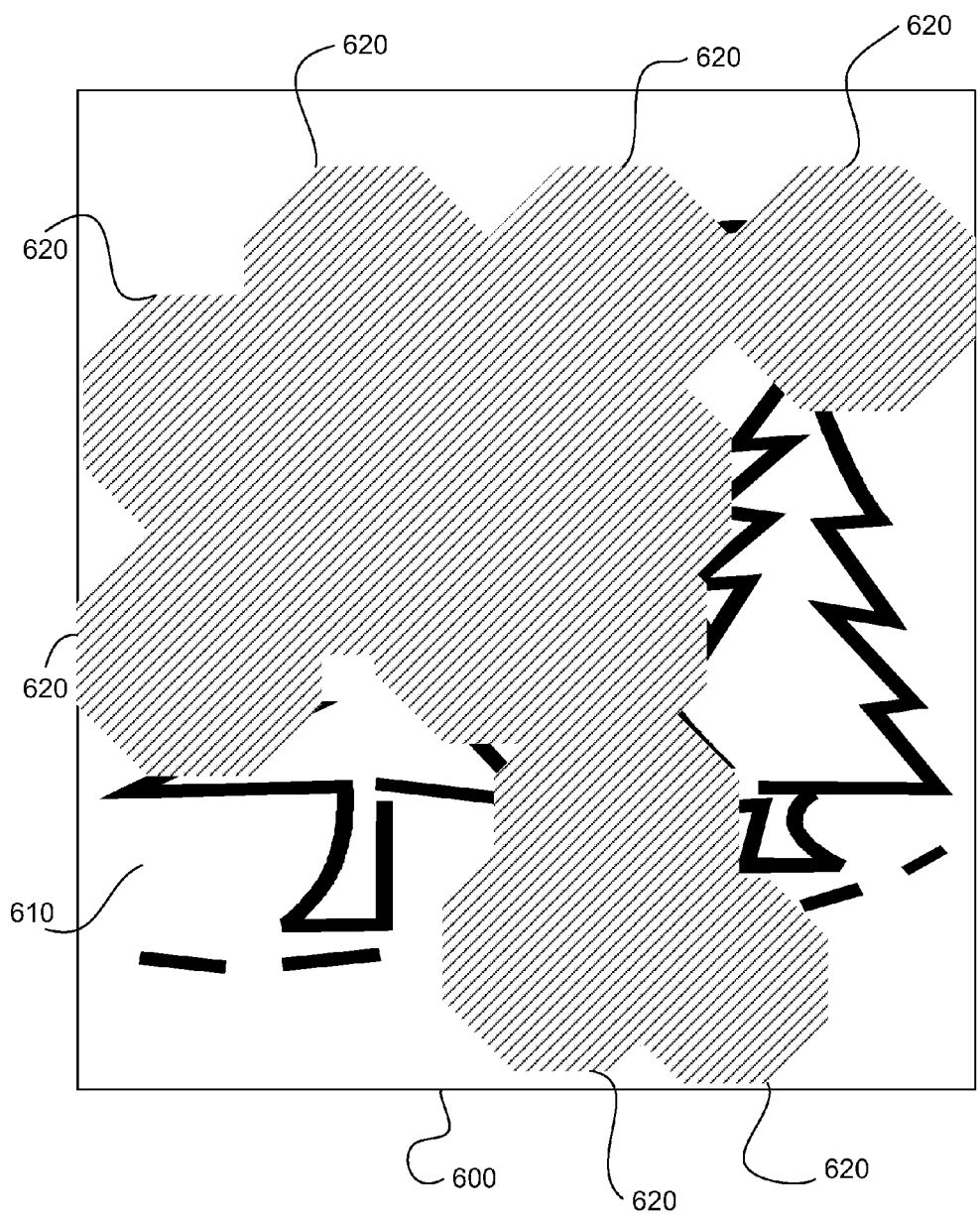
FIG. 6 depicts an exemplary augmented reality visualization which informs a user as to the sufficiency, and corresponding insufficiency, of captured images for an exemplary image scene.

Referring to FIG. 6, the augmented reality visualization 600, also referred to herein as the visualization 600, shows a user 110 an image preview 610 of what the camera 190 of the mobile device 120 sees, i.e., an image preview 610 of the camera 190's current image view 150. In an embodiment, overlaid on top of the image preview 610 are shaded polygons 620. In an embodiment each shaded polygon 620 identifies a region, or area, of the image preview 610, and consequently, a region of the current image view 150, that has previously been captured well, i.e., that through the execution of one or more comparison algorithms 300 a determination has been rendered that there are existing sufficient captured images 170 of the image view region. In an embodiment the regions of the image preview 610 that are not overlaid by a shaded polygon 620 identify the regions of the current image view 150 that currently are insufficiently captured, i.e., those regions that the user 110 ought to still capture one or more images 170 for.

In an embodiment a user 110 can refer to the visualization 600 and quickly and efficiently navigate their mobile device camera 190 to those insufficiently captured regions and capture them with one or more additional images 170. In an embodiment as additional images 170 for previously insufficiently captured regions of an image view 150 are captured and analyzed using one or more embodiment comparison algorithms 300 the md photo cap app 200 generates applicable shaded polygons 620 which are thereafter included within the visualization 600 displayed to the user 110. In this manner in an embodiment when a visualization 600 consists of an image preview 610 that is completely overlaid with shaded polygons 620 the user 110 can determine that there are sufficient captured images 170 for the image view 150 and resultant image scene aspect 180.

In alternative embodiments myriad alternative visualization graphics can be displayed to a user 110 for use in identifying regions of an image view 150 that are sufficiently pictorially captured, and consequently, regions of an image view 150 that one or more images 170 ought still to be captured for. Such alternative embodiment visualization graphics can include, but are not limited to, different shaded shapes overlaying an image preview 610, e.g., squares, circles, triangles, etc., different fills to the shapes overlaying an image preview, e.g., red circles, green triangles, checkerboard filled polygons, etc., a map of the image view 150 with arrows pointing to regions requiring additional image capture, written directions for how the user 110 should position their camera lens to capture desired additional images 170, e.g., "Turn right forty-five degrees, walk forward three steps, take a picture," etc., etc.

In an embodiment the md photo cap app 200 has the capability to inform, or instruct, a user 110 on the aspects 180 of an image scene 100 that currently lack sufficient captured images 170 by augmenting a displayed visualization with audio information output to the user 110 via the user audio interface 250, or, alternatively, outputting audio information in place of a displayed visualization. In an embodiment when the image processing manager 210 of the md photo cap app 200 identifies a camera lens position that encompasses an image view 150 to be captured the image processing manager 210 notifies the user 110 to capture one or more images 170 by, e.g., emitting a sound, e.g., a beep, a bell tone, a melody segment, etc., by instructing the user 110 to capture one or more images 170 by outputting a voice recording, e.g., "Take picture now," etc., etc. In embodiments the md photo cap app 200 can use other audio output to notify a user 110 to capture one or more images 170, e.g., output a recording of directions to a user 110 that describes where and how the user 110 should position their camera 190 to capture desired image(s) 170, e.g., "Turn left ninety degrees," "Walk forward 10 feet," etc., alter an outputted audio signal as a user 110 moves the camera 190 to point to a desired image view 150, e.g., output intermittent beeps when the camera lens is not in an image view position that gradually changes to one continuous beep when the camera lens is positioned at a desired image view 150, increase the tone and/or loudness of an outputted audio signal as a user 110 positions the mobile camera lens closer to, and finally at, a desired image view 150, etc.

In an embodiment, as part of any directions, including a map, that identifies desired image views 150 to be captured, the md photo cap app 200 outputs, via the visual GUI 245 and/or the user audio interface 250, a suggested optimal path for the user 110 to be guided by that enables the user 110 to capture currently uncovered, or under covered, regions of an image scene 100 with a minimal number of captured images 170 and/or optimal movement on the user's part.

In an embodiment where a photosynth is the resultant photographic end product 115 the md photo cap app 200 uploads captured images 170 to a computing device 130 that is executing a bundling algorithm that bundles all the known images 170 of a desired image scene 100. In an embodiment as the computing device 130 receives a new captured image 170 for an image scene 100 it includes the newly captured image 170 in the bundling algorithm execution. In an embodiment the computing device 130 downloads a resultant current photosynth generated by the bundling algorithm at a time t to the mobile device 120, which, via the visual GUI 245 of the md photo cap app 200 executing on the mobile device 120, outputs the current photosynth to the user 110. In this embodiment the user 110 can obtain instantaneous, or near instantaneous, feedback on the quality of the photosynth that can be generated with the currently existing captured images 170 of the desired image scene 100.

In an aspect of this embodiment the mobile device 120 can be put into a photosynth mode where the computing device 130 downloads a generated current photosynth to a user's mobile device 120 every predetermined time block, e.g., every thirty seconds, every minute, every five minutes, etc. In other aspects of this embodiment when the mobile device 120 is put into a photosynth mode the computing device 130 downloads a generated current photosynth to the mobile device 120 at other events, e.g., whenever a new photosynth is created from one or more additional captured images 170, when a user 110 requests an update via their mobile device 120, etc.

Figure 7A:
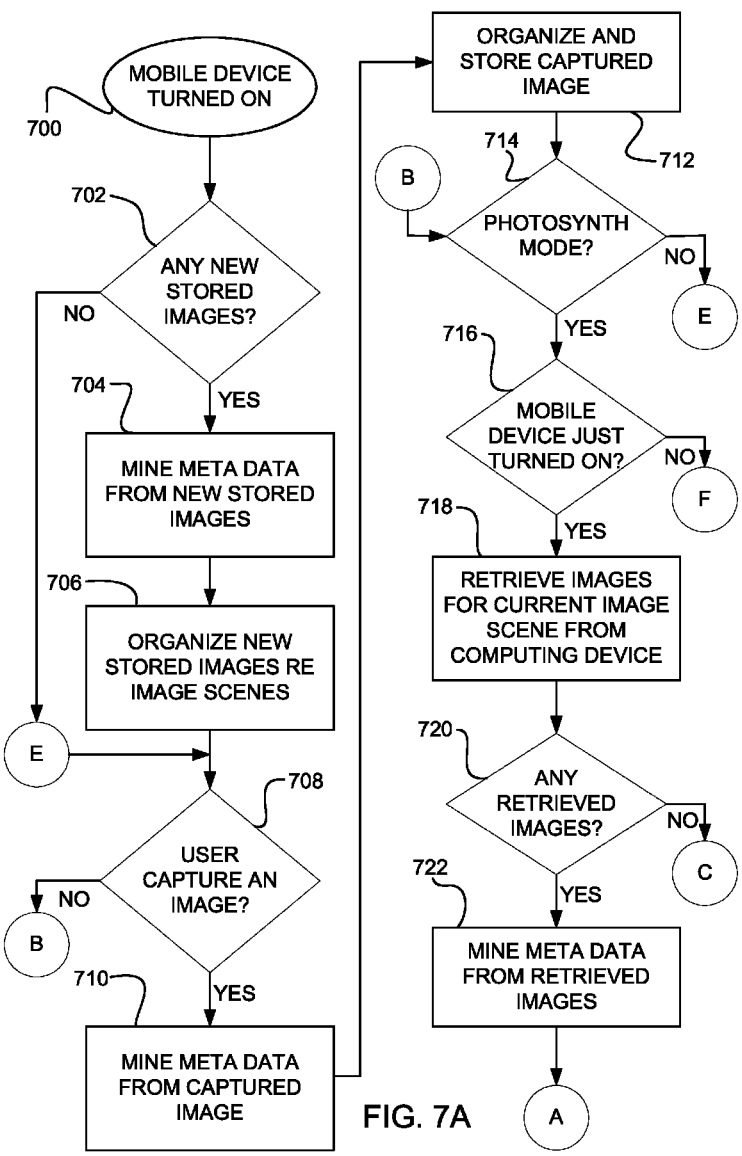
FIGS. 7A-7C illustrate an embodiment logic flow for an embodiment md photo cap application where embodiment comparison algorithms are executed on a user's mobile device.
Figure 7B:
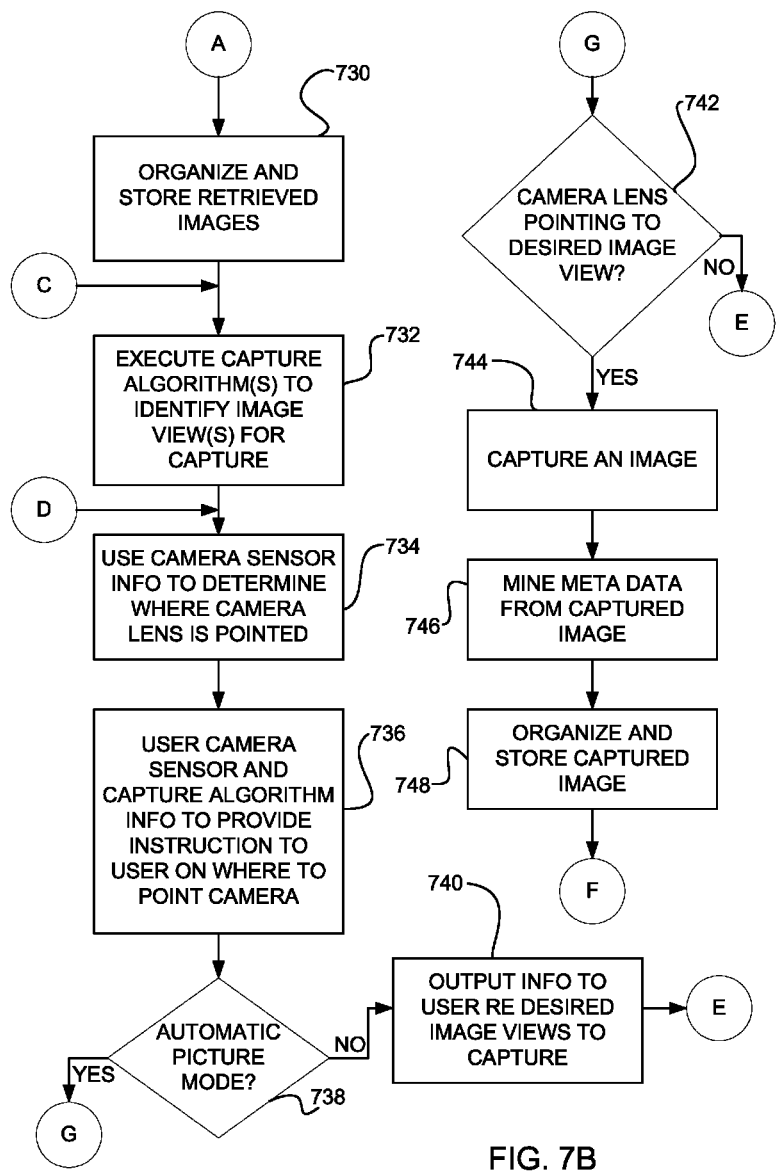
Figure 7C:
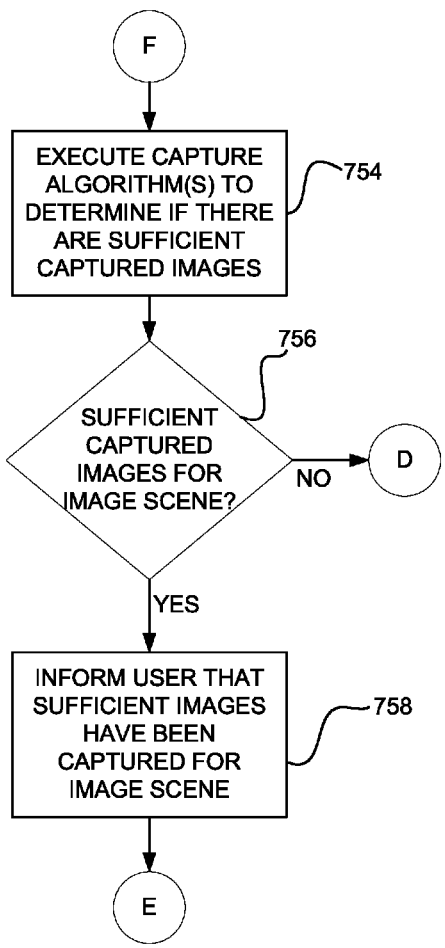

FIGS. 7A-7C illustrate an embodiment logic flow for an embodiment md photo cap app 200 operational on a user's mobile device 120 and executing one or more embodiment calculation algorithms 300 thereon. While the following discussion is made with respect to systems portrayed herein the operations described may be implemented in other systems. The operations described herein are not limited to the order shown. Additionally, in other alternative embodiments more or fewer operations may be performed. Further, the operations depicted may be performed by an embodiment md photo cap app 200 or by an embodiment md photo cap app 200 in combination with one or more other image capture system entities or components.

Referring to FIG. 7A in an embodiment at some time the user's mobile device is turned on, or otherwise activated, 700. In an embodiment at decision block 702 a determination is made as to whether there are any new images stored on the mobile device, i.e., any captured images that have not been processed for an image-based project, e.g., a photosynth, a photo stitch, etc. If yes, in an embodiment meta data is mined and stored for the new images saved on the mobile device 704. In an embodiment the new images stored on the mobile device are organized, ordered, or otherwise arranged, using the mined meta data, pursuant to the image scenes they portray 706.

In an embodiment, whether or not at decision block 702 there were any new images stored on the mobile device, at decision block 708 a determination is made as to whether the user has captured an image. If yes, in an embodiment meta data is mined and stored for the newly captured image 710. In an embodiment the newly captured image is organized, ordered, or otherwise arranged, using the mined meta data, pursuant to the image scene view it portrays 712.

In an embodiment, whether or not a user has captured an image at decision block 708, at decision block 714 a determination is made as to whether the mobile device is in photosynth mode, i.e., whether or not the user is utilizing the mobile device to assist, or otherwise support, the user in capturing images for a photographic end product such as, but not limited to, a photosynth, a photo stitch, etc. In an aspect of this embodiment the user can direct the mobile device to be in photosynth mode. If at decision block 714 the mobile device is not in photosynth mode in an embodiment at decision block 708 a determination is made as to whether the user has captured an image.

If at decision block 714 the mobile device is in photosynth mode then in an embodiment at decision block 716 a determination is made as to whether the mobile device has just been turned on, i.e., whether the md photo cap app has had the opportunity since the last time the mobile device was turned on to attempt to retrieve images for the current image scene from a computing device. If the mobile device has just been turned on, in an embodiment the md photo cap app communicates with a computer device to attempt to retrieve any existing and accessible images previously captured for the current image scene 718.

At decision block 720 a determination is made as to whether there are any retrieved images, i.e., whether there exists on the computing device communicating with the mobile device on which the md photo cap app is executing or on some other computing or storage device accessible to the computing device one or more captured images of the current image scene. If yes, in an embodiment meta data is mined and stored for the newly retrieved images from the computing device 722. Referring to FIG. 7B, in an embodiment the newly retrieved images are organized, ordered, or otherwise arranged, using the mined meta data, pursuant to the image scene views they portray, and are stored on the mobile device 730.

In an embodiment, whether or not there were any retrieved images of the current image scene at decision block 720, the md photo cap app executes one or more capture algorithms on two or more stored images for a current image scene to determine the sufficiency of the captured image set for a photographic end product, e.g., photosynth, etc., and/or to identify one or more image views for desired images to be captured 732. In an embodiment camera sensor information is gathered and analyzed to identify where the camera lens for the user's mobile device is currently directed 734. In an embodiment camera sensor information and/or capture algorithm derived information are used to provide a user information and/or instruction, audio and/or graphical, on where to direct the camera and/or on the regions of a current image scene, or image view, that have sufficient captured images and the regions where one or more images ought still to be captured 736.

In an embodiment at decision block 738 a determination is made as to whether the mobile device is in automatic picture mode. In an aspect of this embodiment the user can direct the mobile device to be in automatic picture mode.

If at decision block 738 the mobile device is in automatic picture mode then in an embodiment at decision block 742 a determination is made as to whether the camera lens of the mobile device is pointing to a desired image view for capture. In an aspect of this embodiment information generated from at least one camera sensor and/or information generated from the execution of at least one capture algorithm is used in making the determination 742 as to whether the camera lens is pointing to a desired image view for capture. If the camera lens is pointing to a desired image view for capture, in an embodiment the image is automatically captured 744. In an embodiment meta data is mined and stored for the newly captured image 746. In an embodiment the newly captured image is organized, ordered, or otherwise arranged, using the mined meta data, pursuant to the image scene view it portrays, and is stored on the mobile device 748.

Referring to FIG. 7C, in an embodiment the md photo cap app executes one or more capture algorithms on two or more stored images for the current image scene to determine the sufficiency of the captured image set for a photographic end product 754. In an embodiment at decision block 756 a determination is made as to whether there are sufficient captured images for the photographic end product. If yes, in an embodiment the user is informed, via audio and/or graphics, that there are sufficient captured images. In an embodiment, and referring again to FIG. 7A, at decision block 708 a determination is made as to whether the user has captured an image.

If at decision block 756 of FIG. 7C it is determined that there are insufficient captured images for the current image scene then in an embodiment and referring again to FIG. 7B, camera sensor information is gathered and analyzed to identify where the camera lens for the user's mobile device is currently directed 734. In an embodiment camera sensor information and/or capture algorithm derived information are used to provide a user information and/or instruction, audio and/or graphical, on where to direct the camera and/or on the regions of a current image scene, or image view, that have sufficient captured images and the regions where one or more images ought still to be captured 736.

Referring again to FIG. 7A, if at decision block 716 it is determined that the mobile device was not just turned on then in an embodiment the md photo cap app executes one or more capture algorithms on two or more stored images for the current image scene to determine the sufficiency of the captured image set for a photographic end product 754. In an embodiment at decision block 756 a determination is made as to whether there are sufficient captured images.

Referring to FIG. 7B, if at decision block 742 it is determined that the camera lens is not directed to a desired image view then in an embodiment, and referring to FIG. 7A, at decision block 708 a determination is made as to whether the user has captured an image.

If it is determined that the mobile device is not in automatic picture mode at decision block 738 of FIG. 7B, then in an embodiment information and/or instruction is output to the user, either audioally or graphically, regarding desired image view(s) that images still ought to be captured for, e.g., instructions for directing the camera lens to a desired image view for capture, a map or diagram depicting sufficiently captured image views of a current image scene and, consequently, insufficiently captured image views, etc. In an embodiment, and referring again to FIG. 7A, at decision block 708 a determination is made as to whether the user has captured an image.

Figure 8A:
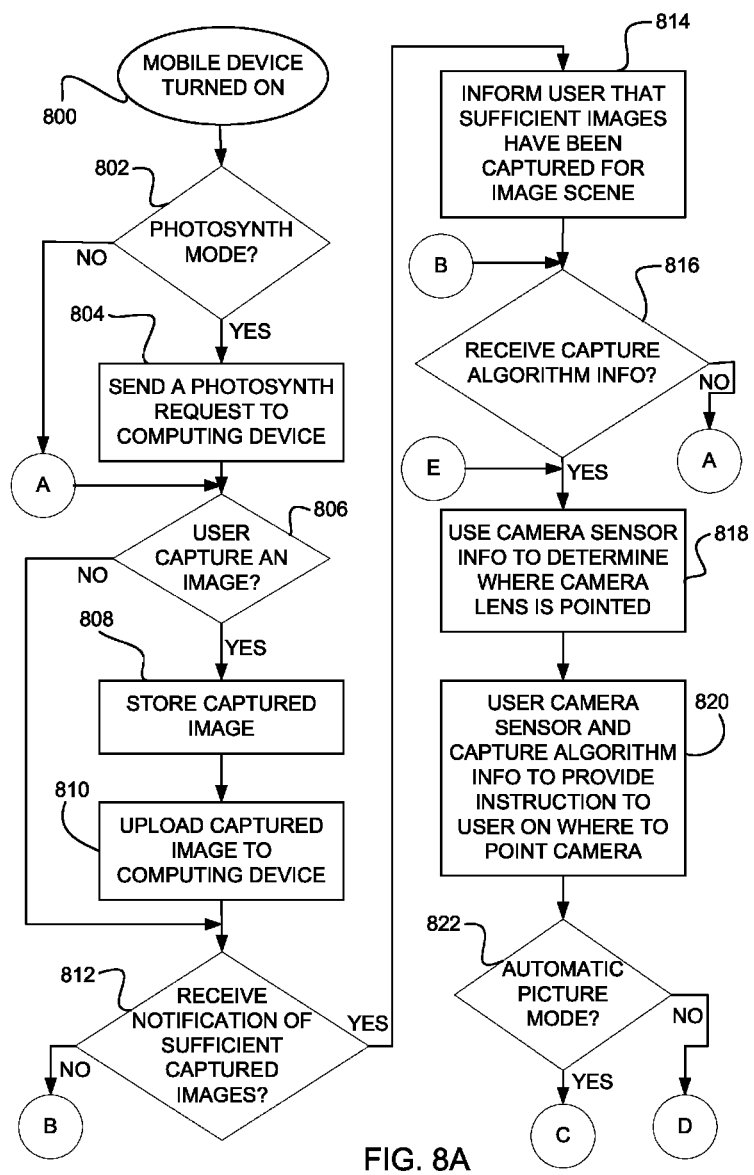
FIGS. 8A-8B illustrate an embodiment logic flow for an embodiment and photo cap application where embodiment comparison algorithms are executed on a computing device other than a user's mobile device.
Figure 8B:
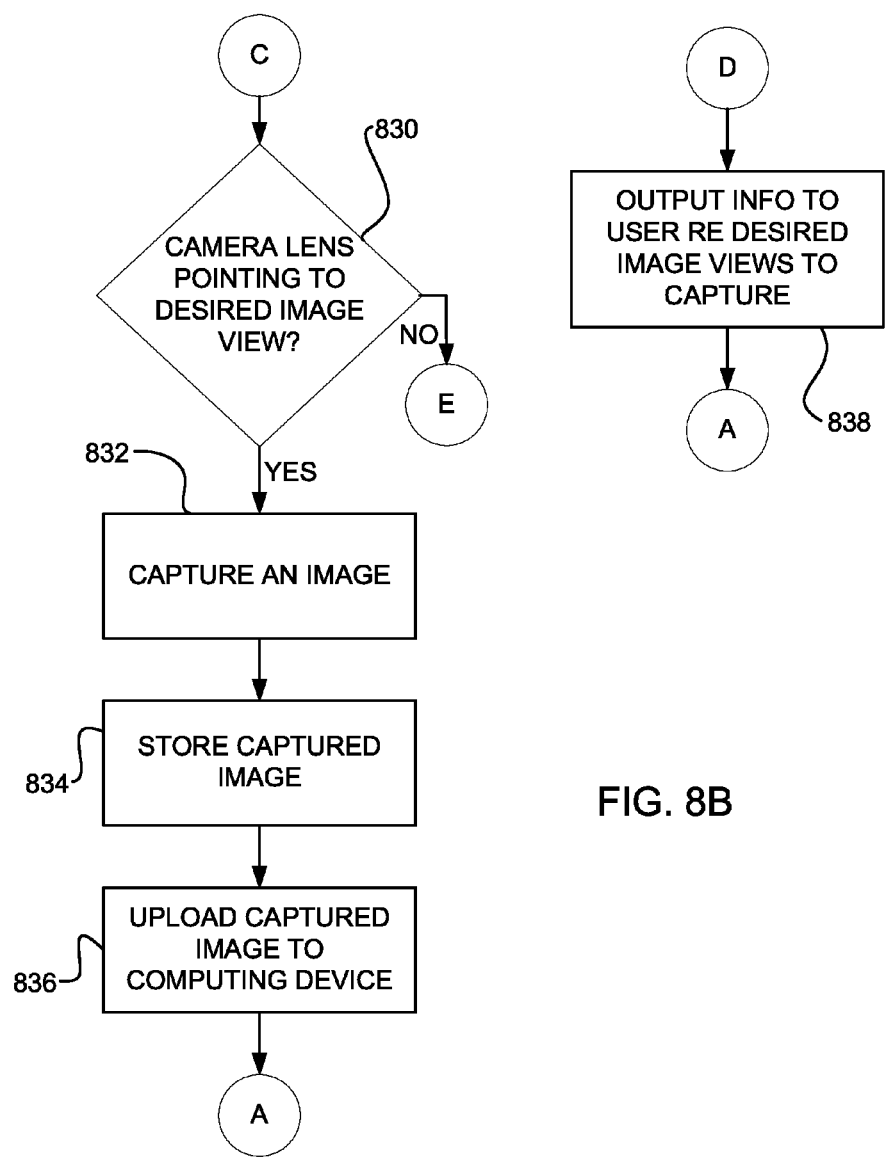

FIGS. 8A-8B illustrate an embodiment logic flow for an embodiment md photo cap app 200 operational on a user's mobile device 120 that obtains information generated by the execution of one or more embodiment calculation algorithms 300 from a computing device 130 on which the calculation algorithm(s) 300 are run. While the following discussion is made with respect to systems portrayed herein the operations described may be implemented in other systems. The operations described herein are not limited to the order shown. Additionally, in other alternative embodiments more or fewer operations may be performed. Further, the operations depicted may be performed by an embodiment md photo cap app 200 or by an embodiment md photo cap app 200 in combination with one or more other image capture system entities or components.

Referring to FIG. 8A in an embodiment at some time the user's mobile device is turned on, or otherwise activated, 800. In an embodiment at decision block 802 a determination is made as to whether the mobile device is in photosynth mode, i.e., whether or not the user is utilizing the mobile device to assist, or otherwise support, the user in capturing images for a photographic end product such as, but not limited to, a photosynth, a photo stitch, etc. In an aspect of this embodiment the user can direct the mobile device to be in photosynth mode. If at decision block 802 the mobile device is in photosynth mode then in an embodiment a photosynth request is sent to a computing device 804. In an aspect of this embodiment, the photosynth request indicates to the computing device that the mobile device is operational to work with the computing device to instruct, or otherwise assist, a user to capture images for a desired photographic end product.

In an embodiment, whether or not the mobile device is in photosynth mode at decision block 802 at decision block 806 a determination is made as to whether the user has captured an image. If yes, in an embodiment the captured image is stored on the mobile device 808. In an embodiment the newly captured image is uploaded to the computing device 810.

In an embodiment at decision block 812 a determination is made as to whether a notification from the computing device has been received indicating there are sufficient captured images for a current image scene. If yes, in an embodiment the user is notified, via audio and/or a display output, that sufficient images exist for the current image scene 814.

Whether or not at decision block 812 a notification from the computing device has been received indicating there are sufficient capture images for the current image scene, in an embodiment at decision block 816 a determination is made as to whether capture algorithm generated information and/or information derived there from output from the computing device has been received. If no, at decision block 806 a determination is made as to whether the user has captured an image.

If at decision block 816 capture algorithm generated information and/or information derived there from has been received, in an embodiment camera sensor information is gathered and analyzed to identify where the camera lens for the user's mobile device is currently directed 818. In an embodiment camera sensor information and/or capture algorithm derived information are used to provide a user information and/or instruction, audio and/or via a display output, on where to direct the camera and/or on the regions of a current image scene, or image view, that have sufficient captured images and the regions where one or more images ought still to be captured 820.

In an embodiment at decision block 822 a determination is made as to whether the mobile device is in automatic picture mode. In an aspect of this embodiment the user can direct the mobile device to be in automatic picture mode.

If at decision block 822 the mobile device is in automatic picture mode then in an embodiment, and referring to FIG. 8B, at decision block 830 a determination is made as to whether the camera lens of the mobile device is pointing to a desired image view for capture. If yes, in an embodiment an image is automatically captured 832. In an embodiment the captured image is stored on the mobile device 834. In an embodiment the newly captured image is uploaded to the computing device 810. In an embodiment control returns to decision block 806 of FIG. 8A where a determination is made as to whether the user has captured an image.

Referring again to FIG. 8B, if at decision block 830 it is determined that the mobile device's camera lens is not pointing to a desired image view for capture then in an embodiment, and referring to FIG. 8A, camera sensor information is gathered and analyzed to identify where the camera lens for the user's mobile device is currently directed 818.

At decision block 822 of FIG. 8A, if it is determined the mobile device is not in automatic picture mode then in an embodiment, and referring to FIG. 8B, information and/or instructions are output to a user, via audio or a display, regarding regions of a current image scene, or image view, that have sufficient captured images and/or regions where one or more images ought still to be captured 838. In an embodiment control returns to decision block 806 of FIG. 8A where a determination is made as to whether the user has captured an image.

Figure 9A:
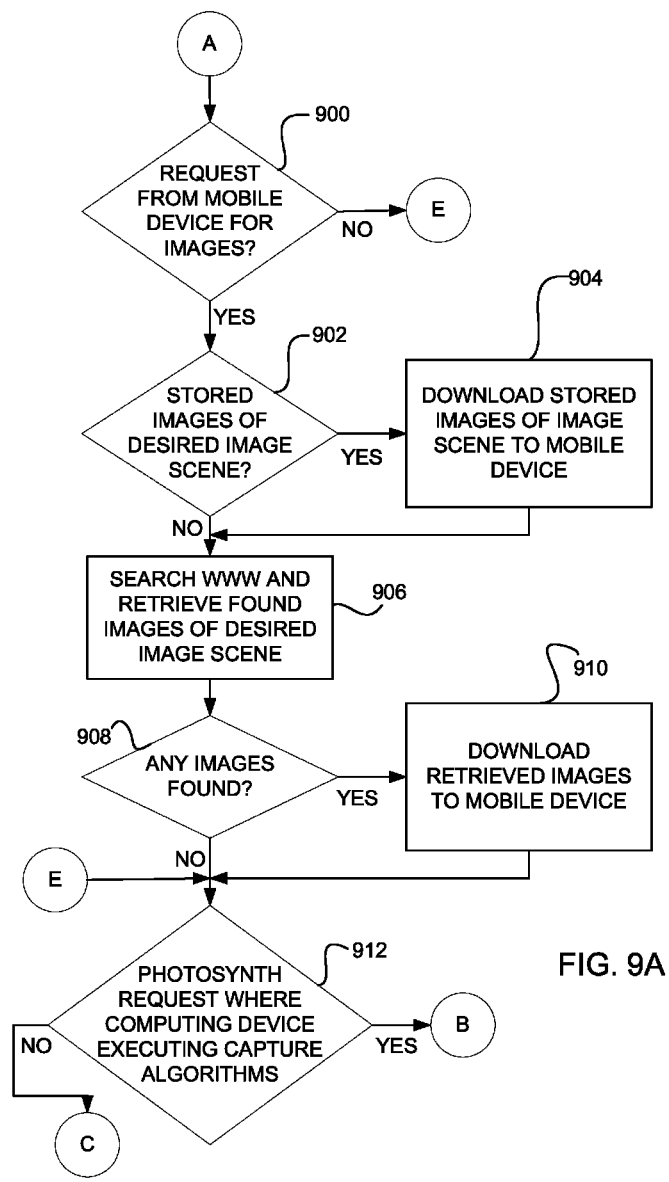
Figure 9B:
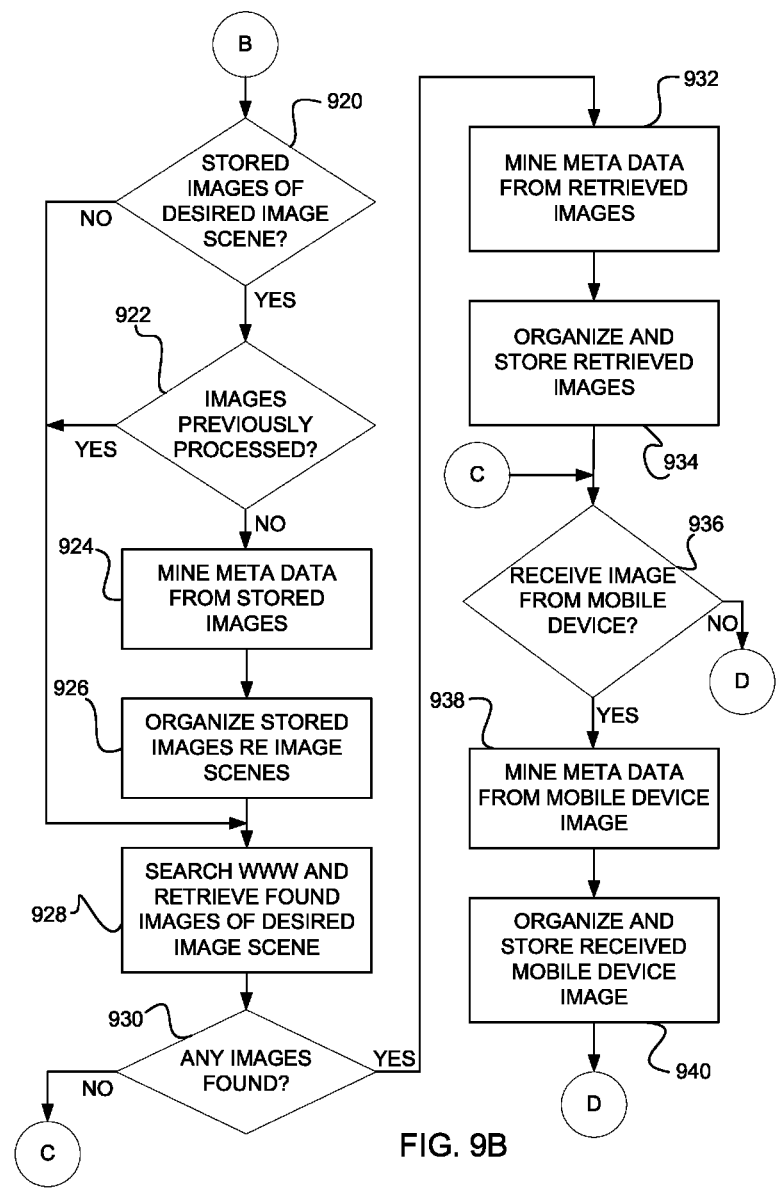

FIGS. 9A-9C illustrate an embodiment logic flow for an embodiment computing device 130 communicating with a second device, e.g., a mobile device 120, to assist a user 110 in capturing desired images 170. While the following discussion is made with respect to systems portrayed herein the operations described may be implemented in other systems. The operations described herein are not limited to the order shown. Additionally, in other alternative embodiments more or fewer operations may be performed. Further, the operations depicted may be performed by an embodiment computing device 130, or computing devices 130, or by an embodiment computing device 130 in combination with one or more other image capture system entities or devices.

Referring to FIG. 9A, in an embodiment at decision block 900 a determination is made as to whether a request has been received for images for an indicated image scene. If yes, in an embodiment at decision block 902 a determination is made as to whether there are responsive images, i.e., images depicting one or more regions of the indicated image scene, stored on or accessible to the computing device. If yes, in an embodiment the responsive stored images are downloaded, or otherwise provided or made accessible to, the requesting device, e.g., mobile device, 904.

In an embodiment whether or not at decision block 902 it is determined that there are responsive images stored on or accessible to the computing device, the computing device searches the internet, world wide web (www), and retrieves identified, available images of the indicated image scene 906. In an embodiment at decision block 908 a determination is made as to whether there were any responsive images located via the internet. If yes, in an embodiment the responsive images retrieved via the internet are downloaded, or otherwise provided or made accessible to, the device communicating with the computing device regarding images, e.g., a mobile device, 910.

In an embodiment whether or not at decision block 908 it is determined that there are responsive images available via the internet, at decision block 912 a determination is made as to whether a photosynth request has been received indicating that the computing device is to execute embodiment capture algorithms on one or more of a set of images for an indicated image scene. In an embodiment the photosynth request indicates a photographic end product is intended, such as, but not limited to, a photosynth, a photo stitch, etc.

If a photosynth request has been received indicating the computing device is to execute embodiment capture algorithms then in an embodiment, and referring to FIG. 9B, at decision block 920 a determination is made as to whether there are currently any images of the indicated image scene stored on or accessible to the computing device. If yes, at decision block 922 a determination is made as to whether the respective stored images have previously been processed, e.g., mined for relevant meta data and organized pursuant to the image scene or region of the image scene they portray. If no, in an embodiment relevant meta data is mined from and stored for each of the images of the indicated image scene stored on or accessible to the computing device 924. In an embodiment the respective images stored on or accessible to the computing device are organized, ordered, or otherwise arranged, using the mined meta data, pursuant to the image scenes, or regions of the image scene, they portray 926.

In an embodiment the computing device searches the internet, world wide web (www), and retrieves identified, available images of the indicated image scene 928. In an embodiment at decision block 930 a determination is made as to whether there were any responsive images located via the internet. If yes, in an embodiment meta data is mined and stored for the responsive images retrieved from the internet 932. In an embodiment the images of the indicated image scene retrieved from the internet are organized, ordered, or otherwise arranged, using the mined meta data, pursuant to the image scenes or regions of the image scene they portray and are stored on or otherwise made accessible to the computing device 934.

In an embodiment at decision block 936 a determination is made as to whether an image has been received, or otherwise uploaded, from, e.g., a mobile device. If yes, in an embodiment meta data is mined and stored for the received image 938. In an embodiment the received image is organized, ordered, or otherwise arranged, using the mined meta data, pursuant to the image scene or region of the image scene it portrays and the received image is stored on or otherwise made accessible to the computing device 940.

In an embodiment and referring to FIG. 9C, at decision block 948 a determination is made as to whether the computing device is to execute one or more embodiment capture algorithms on one or more images of an indicated image scene. If no, in an embodiment, and referring again to FIG. 9A, at decision block 900 a determination is made as to whether a request has been received for images for an image scene. If no, in an embodiment at decision block 912 a determination is made as to whether a photosynth request has been received indicating the computing device is to execute embodiment capture algorithms on one or more of a set of images for an indicated image scene. In an embodiment the photosynth request indicates a photographic end product is intended, such as, but not limited to, a photosynth, a photo stitch, etc.

Referring again to FIG. 9C, if at decision block 948 the computing device is to execute one or more embodiment capture algorithms on one or more images then in an embodiment the computing device executes one or more embodiment capture algorithms using one or more images for the indicated image scene 950. In an embodiment the capture algorithms are executed to determine if there are sufficient captured images for a photographic end product and/or to identify regions of the image scene where there are sufficient captured images and/or regions of the image scene where additional image(s) ought to be captured 950.

In an embodiment at decision block 952 a determination is made as to whether there are sufficient captured images for an image scene. If yes, in an embodiment the computing device issues a notification to, e.g., a mobile device, that there currently exist sufficient captured images for the indicated image scene 956. In an embodiment the computing device outputs capture algorithm generated information and/or information derived there from 958. In an embodiment the capture algorithm generated information can be used by a mobile device to display a photographic end product, or simulation or model of a photographic end product; display a map, diagram, illustration or other representation of the desired image scene, or one or more regions of the desired image scene, identifying the regions where sufficient images have been captured; etc.

In an embodiment control returns to decision block 900 of FIG. 9A where a determination is made as to whether a request has been received for one or more images of an image scene.

If at decision block 952 of FIG. 9C it is determined that there are currently insufficient captured images for an image scene then in an embodiment the computing device provides, or otherwise outputs, capture algorithm generated information and/or information derived there from for use, e.g., in directing or otherwise orchestrating, either via a user or automatically, the capture of one or more additional images 954. In aspects of this embodiment the outputted information consists of information for a user to utilize to locate one or more regions of the image scene that one or more images ought to still be captured for 954; e.g., directions to follow, a map, etc. In an embodiment control returns to decision block 900 of FIG. 9A where a determination is made as to whether a request has been received for one or more images of an image scene.

If at decision block 912 of FIG. 9A no photosynth request has been received or at decision block 930 of FIG. 9B no images of the desired image scene are discovered via a search of the internet then in an embodiment at decision block 936 a determination is made as to whether the computing device has received, or otherwise uploaded, an image.

Computing Device System Configuration

Figure 10:
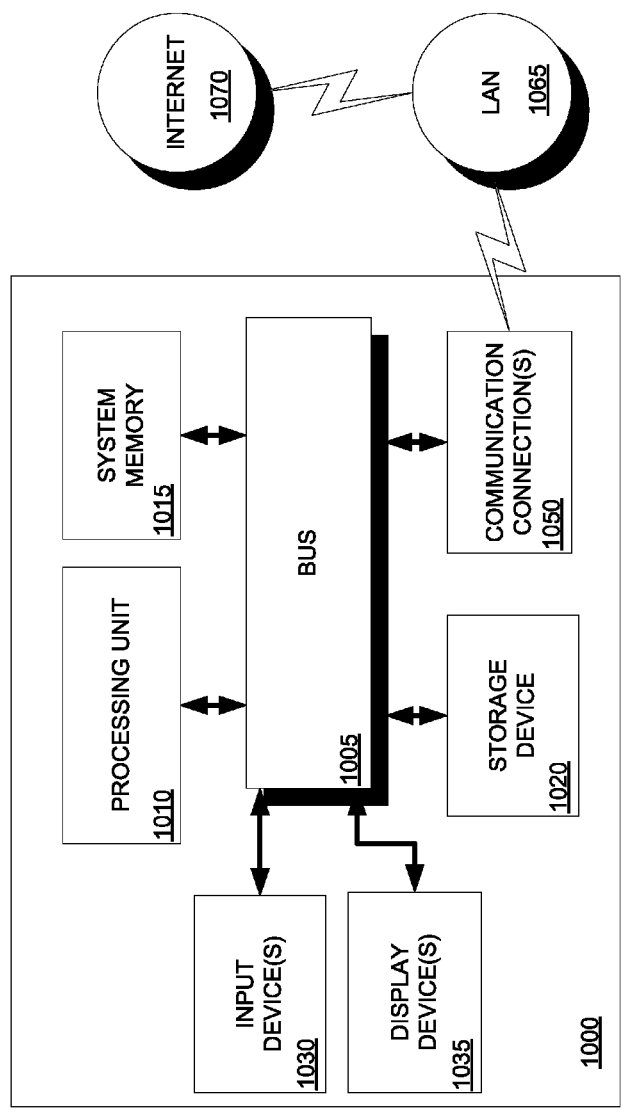
FIG. 10 is a block diagram of an exemplary basic computing device system that can process software, i.e., program code, or instructions.

FIG. 10 is a block diagram that illustrates an exemplary computing device system 1000 upon which an embodiment can be implemented. The computing device system 1000 includes a bus 1005 or other mechanism for communicating information, and a processing unit 1010 coupled with the bus 1005 for processing information. The computing device system 1000 also includes system memory 1015, which may be volatile or dynamic, such as random access memory (RAM), non-volatile or static, such as read-only memory (ROM) or flash memory, or some combination of the two. The system memory 1015 is coupled to the bus 1005 for storing information and instructions to be executed by the processing unit 1010, and may also be used for storing temporary variables or other intermediate information during the execution of instructions by the processing unit 1010. The system memory 1015 often contains an operating system and one or more programs, and may also include program data.

In an embodiment, a storage device 1020, such as a magnetic or optical disk, is also coupled to the bus 1005 for storing information, including program code consisting of instructions and/or data.

The computing device system 1000 generally includes one or more display devices 1035, such as, but not limited to, a display screen, e.g., a cathode ray tube (CRT) or liquid crystal display (LCD), a printer, and one or more speakers, for providing information to a computing device user. The computing device system 1000 also generally includes one or more input devices 1030, such as, but not limited to, a keyboard, mouse, trackball, pen, voice input device(s), and touch input devices, which a user can utilize to communicate information and command selections to the processing unit 1010. All of these devices are known in the art and need not be discussed at length here.

The processing unit 1010 executes one or more sequences of one or more program instructions contained in the system memory 1015. These instructions may be read into the system memory 1015 from another computing device-readable medium, including, but not limited to, the storage device 1020. In alternative embodiments, hard-wired circuitry may be used in place of or in combination with software program instructions. The computing device system environment is not limited to any specific combination of hardware circuitry and/or software.

The term "computing device-readable medium" as used herein refers to any medium that can participate in providing program instructions to the processing unit 1010 for execution. Such a medium may take many forms, including but not limited to, storage media and transmission media. Examples of storage media include, but are not limited to, RAM, ROM, EEPROM, flash memory, CD-ROM, digital versatile disks (DVD), magnetic cassettes, magnetic tape, magnetic disk storage, or any other magnetic medium, floppy disks, flexible disks, punch cards, paper tape, or any other physical medium with patterns of holes, memory chip, or cartridge. The system memory 1015 and storage device 1020 of the computing device system 1000 are further examples of storage media. Examples of transmission media include, but are not limited to, wired media such as coaxial cable(s), copper wire and optical fiber, and wireless media such as optic signals, acoustic signals, RF signals and infrared signals.

The computing device system 1000 also includes one or more communication connections 1050 coupled to the bus 1005. The communication connection(s) 1050 provide a two-way data communication coupling from the computing device system 1000 to other computing devices on a local area network (LAN) 1065 and/or wide area network (WAN), including the world wide web, or internet 1070. Examples of the communication connection(s) 1050 include, but are not limited to, an integrated services digital network (ISDN) card, modem, LAN card, and any device capable of sending and receiving electrical, electromagnetic, optical, acoustic, RF or infrared signals.

Communications received by the computing device system 1000 can include program instructions and program data. The program instructions received by the computing device system 1000 may be executed by the processing unit 1010 as they are received, and/or stored in the storage device 1020 or other non-volatile storage for later execution.

Conclusion

While various embodiments are described herein, these embodiments have been presented by way of example only and are not intended to limit the scope of the claimed subject matter. Many variations are possible which remain within the scope of the following claims. Such variations are clear after inspection of the specification, drawings and claims herein. Accordingly, the breadth and scope of the claimed subject matter is not to be restricted except as defined with the following claims and their equivalents.

What is claimed is:

1. A method for assisting a user in capturing images of an image scene utilizing a camera of a mobile device, the method comprising:

identifying at least two captured images on the mobile device of the image scene;

mining meta data from at least two captured images of the image scene;

communicating with a computing device requesting at least one captured image of the image scene that is not currently stored on the mobile device;

receiving a captured image of the image scene that is not currently stored on the mobile device from the computing device and storing the received captured image of the image scene on the mobile device;

executing a capture algorithm with at least two captured images including the received captured image, wherein the execution of the capture algorithm comprises using meta data mined from at least two captured images of the image scene to generate information identifying a region of the image scene for which at least one image is recommended to be captured; and informing a user of the location of the region of the image scene for at least one image that is recommended to be captured.

2. The method for assisting a user in capturing images of an image scene of claim 1, wherein the user is using a camera to capture images of the image scene and wherein the camera comprises a camera lens and at least one camera sensor, the method further comprising:

obtaining information generated from at least one camera sensor;

using the information generated from at least one camera sensor to determine where the camera lens is directed; and using the information generated from at least one camera sensor and information generated from the execution of the capture algorithm to provide instruction to a user wherein the instruction provided to the user comprises information as to a region of the image scene where the user is recommended to direct the camera lens of the camera.

3. The method for assisting a user in capturing images of an image scene of claim 2, wherein the instruction provided to the user comprises audio directions the user can follow to locate the region of the image scene where the user is recommended to direct the camera lens of the camera.

4. The method for assisting a user in capturing images of an image scene of claim 2, wherein the instruction provided to the user comprises an output display comprising a list of one or more directions the user can follow to locate the region of the image scene where the user is recommended to direct the camera lens of the camera.

5. The method for assisting a user in capturing images of an image scene of claim 2, wherein the camera lens sees a current image view comprising the region of the image scene the camera lens is presently directed at, and wherein the instruction provided to the user comprises an output display comprising the current image view seen by the camera lens with the regions of the current image view that there are existing captured images for identified in the output display.

6. The method for assisting a user in capturing images of an image scene of claim 5, wherein the regions of the current image view identified in the output display comprise those regions of the image scene that there are sufficient existing captured images for and wherein sufficient existing captured images comprises a set of at least one captured image that comprises adequate detail of a region of the image scene for use in generating a photographic end product.

7. The method for assisting a user in capturing images of an image scene of claim 6, wherein the photographic end product comprises a photosynth.

8. The method for assisting a user in capturing images of an image scene of claim 5, wherein the identification of a region of the current image view that there are existing captured images for comprises a graphic symbol imposed on top of the region of the current image view in the output display.

9. The method for assisting a user in capturing images of an image scene of claim 2, wherein the user is utilizing a camera of a mobile device to capture images of the image scene.

10. The method for assisting a user in capturing images of an image scene of claim 1, wherein the user is utilizing a camera of a mobile device to capture images of the image scene, and wherein the mobile device comprises an output display comprising the capability to display photographic end products, the method further comprising:

communicating with a computing device to provide the computing device a captured image of the image scene;

receiving from the computing device a representation of a photographic end product comprising the captured image communicated to the computing device; and outputting the representation of the photographic end product to the user via the output display.

11. The method for assisting a user in capturing images of an image scene of claim 1, wherein the user is utilizing a camera to capture images of the image scene and wherein the camera comprises a camera lens and at least one camera sensor, the method further comprising:

obtaining information generated from at least one camera sensor;

using information generated from at least one camera sensor and information generated from the execution of the capture algorithm to determine when the camera lens is directed to the location of a region of the image scene for at least one image that is recommended to be captured comprising the current image view; and automatically capturing an image of the current image view.

12. The method for assisting a user in capturing images of an image scene of claim 1, wherein the user is utilizing a camera to capture images of the image scene and wherein the camera is a component of a mobile device that comprises a cell phone, and wherein captured images of the image scene are stored on the cell phone, the method further comprising:

executing at least one capture algorithm with captured images of the image scene to generate information on the sufficiency of the captured images for generating a photographic end product; and informing the user that sufficient captured images of the image scene exist for generating the photographic end product wherein no additional images of the image scene are required to be captured to generate the photographic end product.

13. A method for supporting the capture of images of an image scene on a mobile device that includes a camera having a camera lens, the captured images to be used to create a photographic end product, the method comprising:

identifying a set of at least two captured images of the image scene that are stored on the mobile device;

searching the internet for at least one image of the image scene;

retrieving at least one image of the image scene that is discovered from a search of the internet; and storing the at least one image retrieved from the internet on the mobile device as captured images in the set of the at least two captured images, executing a capture algorithm to generate information regarding the sufficiency of the set of captured images for creating the photographic end product; and outputting information on the mobile device regarding the sufficiency of the set of captured images for creating the photographic end product;

wherein outputting information on the mobile device regarding the sufficiency of the set of captured images for creating the photographic end product comprises:

outputting an indication that the set of captured images are insufficient for creating the photographic end product; and outputting information comprising the sufficiency of the set of images for creating the photographic end product.

14. The method of claim 13 for supporting the capture of images of an image scene on a mobile device to be used to create a photographic end product, wherein the photographic end product comprises a photosynth.

15. The method of claim 13 for supporting the capture of images of an image scene on a mobile device to be used to create a photographic end product,
- wherein executing the capture algorithm to generate information regarding the sufficiency of the set of captured images for creating the photographic end product comprises generating information regarding the sufficiency of the set of captured images, including the received captured image for creating the photographic end product; and
- outputting audio directions identifying a region of the image scene that an image is recommended to be captured for.

16. The method for supporting the capture of images of an image scene to be used to create a photographic end product of claim 15, wherein the information identifying a region of the image scene that an image is recommended to be captured for comprises directions for a user to utilize to locate the region of the image scene that an image is recommended to be captured for.

17. A mobile device photo capture application for assisting a user in capturing images of an image scene, the mobile device photo capture application comprising:
- a component comprising the capability to direct the capture and processing of images of the image scene;
- a component comprising stored captured images of the image scene;
- a component comprising the capability to mine meta data from stored captured images of the image scene;
- a component comprising the capability to control at least one sensor of a camera;
- a component comprising the capability to analyze stored captured images of the image scene;
- a component comprising the capability to generate an analysis that comprises information that identifies when there are sufficient stored captured images of the image scene to generate a photographic end product without the need to capture any additional images of the image scene;
- a component that communicates with a computing device for obtaining and storing at least one captured image of the image scene from the computing device;
- a component comprising the capability to execute a comparison algorithm using at least two captured images of the image scene, including the at least one captured image obtained from the computing device, wherein the execution of the comparison algorithm comprises the generation of information comprising an identification of a region of the image scene that at least one image is recommended to be captured for; and
- a component comprising the capability to output a display comprising information that can be referred to locate a region of the image scene that at least one image is recommended to be captured for.

18. The mobile device photo capture application for assisting a user in capturing images of an image scene of claim 17, further comprising:
- a component comprising the capability to determine when the camera lens of a camera is directed to a region of the image scene that at least one image is recommended to be captured for; and
- a component comprising the capability to automatically capture an image when it is determined that the camera lens of the camera is directed to a region of the image scene that at least one image is recommended to be captured for.

* * * * *